(12) United States Patent
Dinescu et al.

(10) Patent No.: US 8,350,880 B2
(45) Date of Patent: Jan. 8, 2013

(54) SELECTIVE HEAT-TRANSFER IMAGING SYSTEM AND METHOD OF USING THE SAME

(75) Inventors: Liviu Dinescu, Chatsworth, CA (US); Kai Li, Diamond Bar, CA (US); Dong-Tsai Hseih, Arcadia, CA (US); Ekaterina Vaskova, Woodside, CA (US); Haochuan Wang, South Pasadena, CA (US); Christine Dang, Garden Grove, CA (US); Zhisong Huang, San Dimas, CA (US); James Johnson, Orange, CA (US)

(73) Assignee: Avery Dennison Corporation, Pasadena, CA (US)

( * ) Notice: Subject to any disclaimer, the term of this patent is extended or adjusted under 35 U.S.C. 154(b) by 197 days.

(21) Appl. No.: 12/669,961

(22) PCT Filed: Jul. 23, 2008

(86) PCT No.: PCT/US2008/008911
§ 371 (c)(1),
(2), (4) Date: Apr. 26, 2010

(87) PCT Pub. No.: WO2009/014701
PCT Pub. Date: Jan. 29, 2009

(65) Prior Publication Data
US 2010/0238252 A1    Sep. 23, 2010

Related U.S. Application Data

(60) Provisional application No. 60/961,670, filed on Jul. 23, 2007.

(51) Int. Cl.
*B41J 33/14* (2006.01)
(52) U.S. Cl. .................................................... 347/217

(58) Field of Classification Search .................. 347/217, 347/215, 213, 221, 171
See application file for complete search history.

(56) References Cited

U.S. PATENT DOCUMENTS
3,922,435 A    11/1975    Asnes
(Continued)

FOREIGN PATENT DOCUMENTS
EP    0780240    6/1997
(Continued)

OTHER PUBLICATIONS

International Preliminary Report on Patentability and Written Opinion dated Feb. 4, 2010 from corresponding International Application No. PCT/US2008/008911.
(Continued)

*Primary Examiner* — Kristal Feggins
(74) *Attorney, Agent, or Firm* — Christie, Parker & Hale, LLP

(57) ABSTRACT

A heat-transfer imaging system and a method of using the same. The heat-transfer imaging system includes a heat-transfer sheet and an activating ink. The heat-transfer sheet and the activating ink are specially formulated so that only the areas of the heat-transfer sheet onto which the ink has been printed become adhesive under heat-transfer conditions. This effect may be achieved by designing the sheet to include an ink-receptive coating whose melting temperature is higher than that typically encountered during normal heat-transfer conditions and by formulating the activating ink to include a plasticizer that, when printed onto the ink-receptive coating, lowers the melting temperature of the ink-receptive coating sufficiently so that the modified melting temperature falls within the temperature range encountered during heat-transfer.

40 Claims, 7 Drawing Sheets

U.S. PATENT DOCUMENTS

| | | | |
|---|---|---|---|
| 4,294,641 | A | 10/1981 | Reed et al. |
| 4,626,284 | A | 12/1986 | Ohta et al. |
| 4,703,113 | A | 10/1987 | Baxter et al. |
| 4,773,953 | A | 9/1988 | Hare |
| 4,963,189 | A | 10/1990 | Hindagolla |
| 5,026,427 | A | 6/1991 | Mitchell et al. |
| 5,086,698 | A | 2/1992 | Wirz |
| 5,141,556 | A | 8/1992 | Matrick |
| 5,160,370 | A | 11/1992 | Suga et al. |
| 5,169,436 | A | 12/1992 | Matrick |
| 6,139,672 | A | 10/2000 | Sato et al. |
| 7,160,411 | B2 | 1/2007 | Williams et al. |
| 2002/0196320 | A1 | 12/2002 | Hale |
| 2006/0019043 | A1 | 1/2006 | Kronzer |
| 2006/0169399 | A1 | 8/2006 | Kronzer |
| 2006/0172094 | A1 | 8/2006 | Shi et al. |

FOREIGN PATENT DOCUMENTS

| | | |
|---|---|---|
| EP | 1710077 | 10/2006 |
| WO | 98/04960 | 2/1998 |

OTHER PUBLICATIONS

International Search Report dated Oct. 28, 2008 from corresponding International Application No. PCT/US2008/008911.

Amendment dated Feb. 8, 2010 from related European Application No. 08794650.5.

Amendment dated Apr. 26, 2010 from related European Application No. 08794650.5.

Office Action dated Mar. 13, 2012 from related European Application No. 08794650.5.

Response dated Jul. 23, 2012 from related European Application No. 08794650.5.

SELECTIVE HEAT-TRANSFER IMAGING SYSTEM AND METHOD OF USING THE SAME

CROSS-REFERENCE TO RELATED APPLICATIONS

Priority is claimed to U.S. Provisional Patent Application Ser. No. 60/961,670, filed on Jul. 23, 2007, entitled "Durable Selective Heat Image Transfer For Fabric Application," by Liviu Dinescu, Kai Li, Dong-Tsai Katya Vaskova, Hoachuan Wang, and Christine Dang, and International Patent Application No. PCT/US2008/1008911, filed on Jul. 23, 2008, entitled "Selective Heat-Transfer Imaging System And Method Of Using The Same," by Liviu Dinescu, Kai Li, Dong-Tsai Hseih, Ekaterina Vaskova, Hoachuan Wang, Christine Dang, Zhisong Huang, and James Johnson, which applications are incorporated by reference herein in their entireties.

BACKGROUND OF THE INVENTION

The present invention relates generally to the application of images onto articles of commerce, particularly onto articles of clothing, and relates more particularly to the application of images onto such articles of commerce using heat-transfer imaging techniques.

In recent times, there has been considerable growth in the industry devoted to the consumer-personalization of clothing items, such as T-shirts, sportswear and the like. The creation of such personalized items typically takes place using either one of two different techniques, namely, by directly printing a personalized image onto the article of clothing or by printing an image onto a transfer sheet and then transferring the printed image from the transfer sheet to the intended article using heat and pressure.

Consumer-personalization via direct printing is typically performed in specialty shops as a "do-it-for-you" approach. According to this approach, a consumer, using an e-commerce web server, sends to the shop a graphic image in digital format, together with information on the type, color and size of clothing article. The shop then electronically transforms the graphic image into a standard graphic format and subsequently transmits the formatted image to a direct-to-fabric industrial printer for a final printing. Before shipping the personalized item to the consumer, the shop may use heat-pressing to further fix the image.

It should be noted that the aforementioned direct printing technique results in only the graphic image being printed on the article, with the fabric material of the article, itself, providing the background for the image.

The types of printers used in the above-described direct printing technique are typically high-output, digital, ink-jet printers. Although such printers are capable of providing photo-realistic images on T-shirts and the like, they are limited by a number of drawbacks: First, when reactive dyes are used that bind chemically to fabrics, such dyes require specialized pre- and post-processing that makes small varied orders uneconomical. Second, when pigment-based inks are used that have limited binding to fabrics, the images are thin and not very durable after many wash/dry cycles. Third, because the image is printed directly onto the article, the printed resolution of the image is typically limited by how fine or course the article is. Fourth, there is typically a high capital spending associated with using very specialized printers. Fifth, the printing process involves expensive consumables, such as inks.

Consumer-personalization via image transfer typically involves the use of a heat-transfer sheet as an intermediate holder of a graphic image. The image transfer technique enables consumer-personalization to be performed not only by specialized shops but also by the consumer, herself, using common household articles, such as a desktop, ink-jet printer for printing and an iron for heat-transfer. Background information relating to the image transfer technique may be found in the following illustrative patents and published patent applications, all of which are incorporated herein by reference: U.S. Pat. No. 7,160,411, inventors Williams et al., which issued Jan. 9, 2007; U.S. Patent Application Publication No. US 2006/0172094 A1, inventors Shi et al., which was published Aug. 3, 2006; U.S. Pat. No. 6,139,672, inventors Sato et al., which issued Oct. 31, 2000; U.S. Pat. No. 4,773,953, inventor Hare, which issued Sep. 27, 1988; and U.S. Pat. No. 4,294,641, inventors Reed et al., which issued Oct. 13, 1981.

The heat-transfer sheet used in the aforementioned image transfer technique typically comprises a non-transferable support, such as a release-coated paper or a film carrier, and a heat-transferable portion, which may include a polymer-based coating that undergoes melting or softening when heat is applied, with the graphic image typically being reverse-printed directly onto the exposed surface of the heat-transferable portion. Alternatively, the aforementioned polymer-based coating onto which the image is printed may be omitted from the heat-transfer sheet as the heat-transfer sheet may consist solely of the non-transferable support, e.g., the release-coated paper or the film carrier. In this latter case, the heat-transferable part typically consists of the ink layer that is delivered by the printing device and that forms the graphic image.

The graphic image applied to the heat-transfer sheet may be printed using analog printing techniques or digital printing techniques. Examples of suitable analog printing techniques include letterpress, flexography, gravure, reverse gravure, off-set lithography (wet and dry), flat and rotary screen, hot and cold stamping, pens and markers. Such techniques are capable of applying a thick, mechanically-durable, graphic image. Examples of suitable digital printing techniques include using common desktop and wide format shop printers, such as ink-jet, toner-based laser, ion or electron charge deposition printing, copy machines, phaser and direct thermal or thermal transfer printers, etc. In general, digital printing techniques result in a much smaller amount of ink or toner being printed. Consequently, if a digital printing technique is used, the transfer sheet typically includes the polymer-based meltable coating (as opposed to lacking such a coating and having the image printed directly on the non-transferable support) as such a coating is used to absorb or to hold in place the graphic image. In certain instances, a combination of both analog and digital printing techniques may be used on a heat-transfer sheet.

When performing image transfer on clothing items using heat-transfer sheets that include a polymer-based meltable coating, it is often desirable to transfer only the printed areas of the transfer sheet and not the unprinted background areas. This is because the polymer-based meltable coating can leave a visible background halo around the printed image on the fabric. Such a halo may be aesthetically undesirable.

One approach to the foregoing problem of a background halo has been to mechanically remove the background polymer-based coating from the printed heat-transfer sheet prior to heat-transfer. The mechanical removal of the coating is performed using a digitally-controlled mechanical cutter that cuts around the graphic design image. After cutting, the coating from the extraneous non-printed areas is removed. The aforementioned process is known in the art as mechanical weeding. Unfortunately, mechanical weeding can be complicated and slow, especially when applied to very fine and detailed graphic designs.

An alternative approach to mechanical weeding is disclosed in U.S. Patent Application Publication No. US 2006/0019043 A1, inventor Kronzer, published Jan. 26, 2006, which is incorporated herein by reference. In the aforementioned publication, there is disclosed a heat transfer material kit that includes a first image transfer material and a second image transfer material, the first image transfer material including a printable non-porous surface, the second image transfer material including an outer layer having a film-forming binder and thermoplastic particles. A method of using the kit involves (a) imaging the substantially non-porous printable surface of the first image transfer material to form an imaged surface having printed and unprinted areas; (b) positioning the outer layer of the second image transfer material adjacent to the imaged surface; (c) transferring a portion of the outer layer of the second image transfer material to the printed area on the first image transfer material while transferring a lesser portion of the outer layer of the second image transfer material to the non-printed area on the first image transfer material to form a coated imaged surface having a non-printed area with less coating than the printed area; and (d) transferring the coated image to a substrate.

Unfortunately, the approach of the above-described Kronzer publication is made complicated by the necessity of providing two different types of image transfer materials and by the limited utility of the approach to toner-based printers. In addition, the half-toning process used by laser printers to achieve the grey scale could make the above method difficult to work on lighter colored images where toner density is lower.

SUMMARY OF THE INVENTION

The present invention is directed at a novel heat-transfer imaging system and at a method for using the same.

According to one aspect of the invention, a heat-transfer imaging system is provided, the heat-transfer imaging system comprising a heat-transfer sheet and an activating ink. The heat-transfer sheet and the ink are specially formulated so that only the areas of the heat-transfer sheet onto which the ink has been printed become adhesive under heat-transfer conditions.

According to another aspect of the invention, a heat-transfer imaging system is provided, the heat-transfer imaging system comprising (a) a heat-transfer sheet, the heat-transfer sheet comprising a support portion and an ink-receptive coating, the ink-receptive coating being releasably coupled to the support portion, the ink-receptive coating possessing a melting temperature greater than a heat-transfer temperature, the heat-transfer temperature being no less than about 140° F. and no greater than about 400° F.; and (b) an activating ink, the activating ink being printable on the ink-receptive coating and comprising an agent for lowering the melting temperature of the ink-receptive coating in an area contacted with the activating ink to no more than the heat-transfer temperature.

According to yet another aspect of the invention, a method of transferring an image to a substrate is provided, the method comprising the steps of (a) providing a heat-transfer device; (b) providing a heat-transfer sheet, the heat-transfer sheet comprising a support portion and an ink-receptive coating, the ink-receptive coating being releasably coupled to the support portion, the ink-receptive coating possessing a first melting temperature; (c) providing an activating ink, the activating ink being printable on the ink-receptive coating of the heat-transfer sheet and comprising an agent for lowering the melting temperature of the ink-receptive coating in an area contacted with the activating ink to a second melting temperature; (d) printing an image onto the ink-receptive coating of the heat-transfer sheet using the activating ink, the activating ink being printed onto a portion, but not all, of the ink-receptive coating of the heat-transfer sheet, whereby one or more printed areas of the ink-receptive coating and one or more non-printed areas of the ink-receptive coating are produced; and (e) contacting the ink-receptive coating with the substrate using the heat-transfer device operated at an operating temperature of no less than about 140° F. and no more than about 400° F., wherein the second melting temperature of the one or more printed areas of the ink-receptive coating is less than the operating temperature of the heat-transfer device and the first melting temperature of the one or more non-printed areas of the ink-receptive coating is greater than the operating temperature of the heat-transfer device, whereby the one or more printed areas of the ink-receptive coating transfer to the substrate and the one or more non-printed areas of the ink-receptive coating do not transfer to the substrate.

According to still yet another aspect of the invention, a method of transferring at least a portion of an image to a substrate is provided, the method comprising the steps of (a) providing a heat-transfer device; (b) providing a heat-transfer sheet, the heat-transfer sheet comprising a support portion and an ink-receptive coating, the ink-receptive coating being releasably coupled to the support portion, the ink-receptive coating possessing a first melting temperature; (c) providing an activating ink, the activating ink being printable on the ink-receptive coating of the heat-transfer sheet and comprising an agent for lowering the melting temperature of the ink-receptive coating to a second melting temperature; (d) printing an image onto the ink-receptive coating of the heat-transfer sheet; (e) printing the activating ink onto a portion, but not all, of the ink-receptive coating of the heat-transfer sheet, whereby one or more activated areas of the ink-receptive coating and one or more non-activated areas of the ink-receptive coating are produced, the one or more activated areas containing at least a portion of the image; and (f) contacting the ink-receptive coating with the substrate using the heat-transfer device operated at an operating temperature of no less than about 140° F. and no more than about 400° F., wherein the second melting temperature of the one or more activated areas of the ink-receptive coating is less than the operating temperature of the heat-transfer device and the first melting temperature of the one or more non-activated areas of the ink-receptive coating is greater than the operating temperature of the heat-transfer device, whereby the one or more activated areas of the ink-receptive coating transfer to the substrate and the one or more non-activated areas of the ink-receptive coating do not transfer to the substrate.

According to a further aspect of the invention, there is provided the combination of a heat-transfer device and a heat-transfer imaging system, the heat-transfer device being operated an operating temperature of no less than about 140° F. and no more than about 400° F., the heat-transfer imaging system comprising a heat-transfer sheet and an activating ink, the heat-transfer sheet comprising a support portion and an ink-receptive coating, the ink-receptive coating being releasably coupled to the support portion, the ink-receptive coating possessing a melting temperature greater than the operating temperature of the heat-transfer device, the activating ink being printable on the ink-receptive coating and comprising an agent for lowering the melting temperature of the ink-receptive coating in an area contacted with the activating ink to no more than the operating temperature of the heat-transfer device.

According to still a further aspect of the invention, there is provided an intermediate assembly for use in heat-transfer, the intermediate assembly comprising a substrate having first and second surfaces, the first surface having a release layer thereon and an image layer provided over the release layer; and wherein the image layer includes a first area having a first melting point above 400° F. and a second area having a second melting point less than the first melting point defining a graphic.

For purposes of the present specification and claims, it is to be understood that certain terms used herein, such as "on" or "over," when used to denote the relative positions of elements in a heat-transfer sheet, are primarily used to denote such relative positions in the context of how those elements are situated prior to transfer of the transfer portion of the sheet onto an article since, after transfer, the positions of those elements may be reversed or otherwise differ.

Objects, features, advantages and aspects of the present invention, will be set forth in part in the description which follows, and in part will be obvious from the description or may be learned by practice of the invention. In the description, reference is made to the accompanying drawings which form a part thereof and in which is shown by way of illustration a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense.

BRIEF DESCRIPTION OF THE DRAWINGS

The accompanying drawings, which are hereby incorporated into and constitute a part of this specification, illustrate a preferred embodiment of the invention and, together with the description, serve to explain the principles of the invention. In the drawings wherein like reference numerals represent like parts.

DETAILED DESCRIPTION OF PREFERRED EMBODIMENTS

Figure 1:
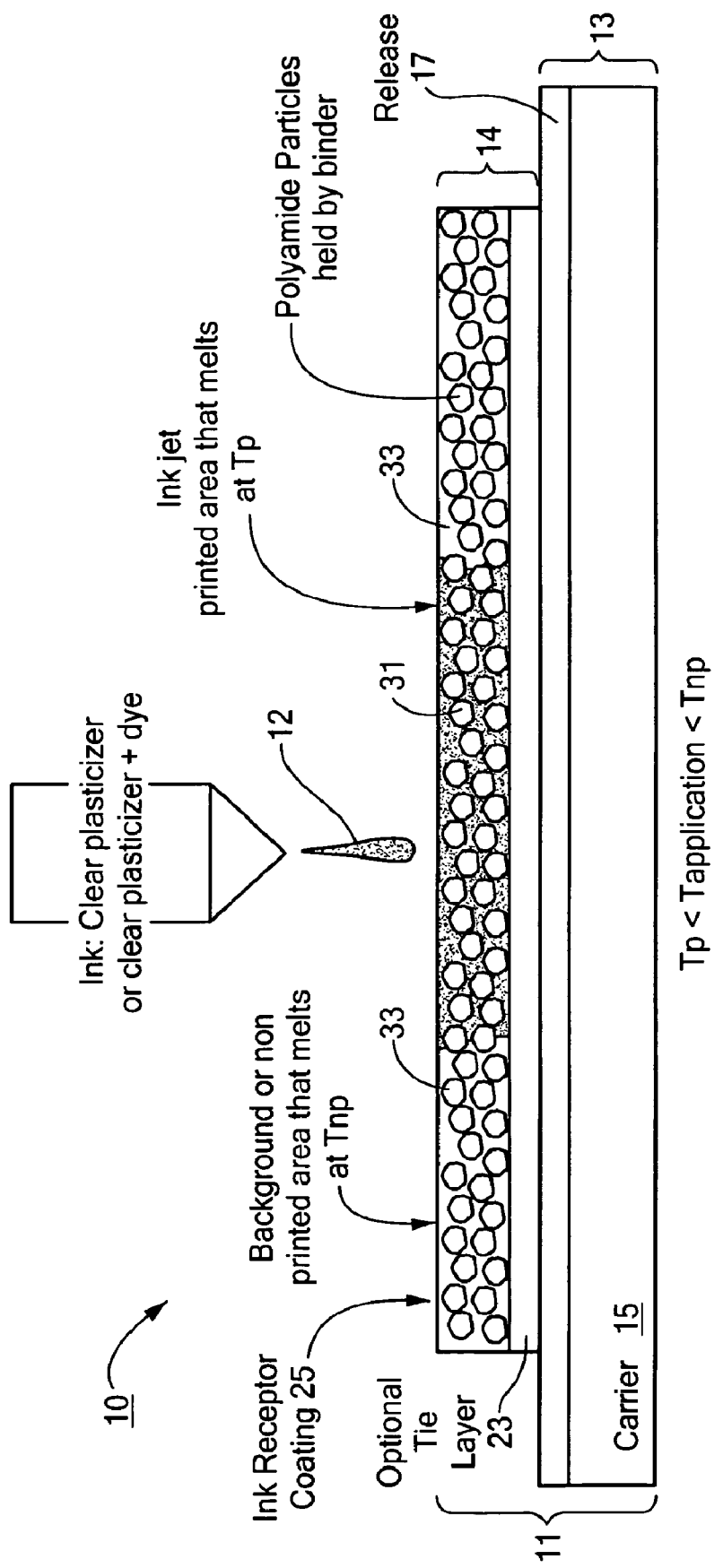
FIG. 1 is a schematic end view of a first embodiment of a heat-transfer imaging system designed according to the teachings of the present invention.

Referring now to FIG. 1, there is schematically shown an end view of a first embodiment of a selective heat-transfer imaging system designed in accordance with the teachings of the present invention, the selective heat-transfer imaging system being represented generally by reference numeral 10.

System 10 may include a heat-transfer sheet 11 and an activating ink 12, activating ink 12 activating the areas of heat-transfer sheet 11 printed therewith so that, under heat-transfer conditions (e.g., at a temperature preferably no less than about 140° F. and preferably no greater than about 400° F.), the printed areas may be selectively transferred from sheet 11 to a substrate.

Heat-transfer sheet 11 may include a support portion 13 and a transferable portion 14. It should be understood that, although only a single transferable portion 14 is shown in FIG. 1, one need not position only one transferable portion 14 per support portion 13, but rather, one may space apart, preferably at regular intervals, a plurality of identical or different transferable portions 14 on a common support portion 13.

Support portion 13 may function as a temporary support for the printed areas of transferable portion 14 and may be used to carry transferable portion 14 of sheet 11 during coating, converting, packaging and other manufacturing steps. As will be explained further below, during heat-transfer, support portion 13 is preferably peeled away and detached from the activated areas of transferable portion 14. Properties, such as dimensional stability and cohesion under heat-transfer conditions, may be very important for support portion 13.

Support portion 13, in turn, may comprise a carrier 15. Carrier 15 may be a polymer film substrate, a paper substrate (filed or sized or not), or a polymer-coated paper substrate. For example, carrier 15 may be a polymer film substrate having a glass transition temperature in the range of 60° C. to 250° C. and having a storage modulus in the range of $1.0 \times 10^{10}$ dynes/cm$^2$ to $2.0 \times 10^{10}$ dynes/cm$^2$ at ambient temperature and a storage modulus in the range of $5.0 \times 10^7$ to $1.5 \times 10^{10}$ dynes/cm$^2$ at 100° C. Examples of polymer film substrates suitable for use as carrier 15 may include polyimide films (PI), polyester films, particularly polyethylene terephthalate (PET) films and poly(ethylene 2,6-naphthalene dicarboxylate) (PEN) films, and oriented polypropylene films, such as heat-stabilized, oriented polypropylene films. As compared to some plastic materials like polyethylene and non-oriented polypropylene, polyester may have better mechanical properties and may make a better substrate to be printed onto. In addition, unlike polyethylene, polyester typically does not tend to soften and become tacky at the types of temperatures typically encountered during heat-transfer.

In those instances in which carrier 15 is in the form of a plastic film, carrier 15 may have a thickness of about 0.5-7 mil, particularly about 0.9-3.0 mil, even more particularly about 1.4-2 mil.

In those instances in which carrier 15 is a plastic film of the type described above, carrier 15 may also be optically clear. As can readily be appreciated, one benefit to using a clear material as carrier 15 is that, if desired, one can inspect the quality of the printed matter of the label by looking at said printed matter through carrier 15 (from which perspective said printed matter appears as it will on the labeled article).

In those instances in which carrier 15 is in the form of a paper, the paper may be a paper of the type described in U.S. Pat. No. 6,113,725, inventor Kroner, Sep. 5, 2000, which is incorporated herein by reference. Examples of papers that may be suitable for use as carrier 15 may include plain paper, clay-coated paper, polymer-impregnated paper, and polymer-coated paper. The thickness of the paper may be in the range of about 1 mil (25μ) to about 10 mil (254μ), more preferably about 2 mil (50μ) to about 6 mil (125μ), even more preferably about 3 mil (75μ) to about 4 mil (100μ). The basis weight of the paper may be in the range of about 10 lbs/1300 ft$^2$ to about 100 lbs/1300 ft$^2$, more preferably about 20 lbs/1300 ft$^2$ to about 60 lbs/1300 ft$^2$, even more preferably about 30 lbs/1300 ft$^2$ to about 40 lbs/1300 ft$^2$.

In those instances in which carrier 15 is in the form of a polymer-coated paper, a number of different types of polymers may be used to coat the paper. Examples of such polymers may include acrylic polymers and copolymers, polyesters, polyamides, polyurethanes, polyethylene vinyl acetates, and thermoplastic polyolefins, such as polyethylene and polypropylene. Coating methods used to coat papers with such polymers may include: rod, air knife, dye and curtain coatings of polymers from water-based emulsions or solvent-based solutions, and hot-melt extrusion and/or lamination. Preferred polymer-coated papers include papers coated with melt-extruded films. An example of a polymer-coated paper suitable for use as carrier 15 is commercially available from Neenah Paper (Neenah, Wis.) as product 9773P0, a 24 lb Avon white super smooth classic crest paper extruded on one side with a polyethylene coating (6 lb/1300 ft$^2$) with a total basis weight of 30.3 lb/1300 ft$^2$.

Support portion 13 may additionally include a release layer or coating 17, coating 17 preferably being applied directly to the top surface of carrier 15. Coating 17 may be a release material that, under heat-transfer conditions, separates easily from an activated, i.e., printed, area of transferable portion 14 (but does not separate as easily from a non-activated area of transferable portion 14) and is not transferred, to any visually discernible degree, with said activated area onto a substrate. (For purposes of the present specification and claims, the term visually discernible is to be construed in terms of an unaided or naked human eye.) Moreover, in addition to separating cleanly from the activated areas of transferable portion 14, coating 17 preferably permits the rapid (i.e., within a few seconds) separation of the activated areas of transferable portion 14 from coating 17 after the activated areas of transferable portion 14 have been applied to a substrate. Release coating 17 may be clear for the same types of reasons given above in connection with carrier 15.

Release coating 17 may be formulated for compatibility with transferable portion 14, particularly the ink-receptive coating of transferable portion 14. Thus, the polarity of release coating 17 should be relatively high and in the same range with the polarity of the ink-receptive coating. When the polarity of the release coating is low, such as in case of silicones, then additives may be used to increase the overall compatibility with the ink-receptive coating. As described in U.S. Patent Application Publication No. US 2006/0169399 A1, inventor Kronzer, which was published on Aug. 3, 2006, which is incorporated herein by reference, a measure of polymer compatibility uses solubility parameters as an expression for polarity.

Materials suitable for use as release coating 17 may include acrylics, silicones, polyurethanes, and the like. Preferred examples of materials for use in release coating 17 may include HYCAR 26706 acrylic emulsion (The Lubrizol Corporation, Wickliffe, Ohio) and the silicone emulsion system 3200 from Dow Corning Corporation, Midland, Mich. (base silicone SM3200, CRA agent SM3030 and catalyst emulsion SM 3010). It may be desirable to cross-link the polymer in release coating 17 to achieve an elevated softening point. Certain cross-linkers that can bind reactively with the carboxylic group of acrylic and urethane emulsions may be used. An example of an effective cross-linker is XAMA 7, a polyaziridine oligomer from Ichemco srl (Cuggiono, Italy). Other cross-linkers that may be used include water-dispersible polyisocyanates, such as BAYHYDUR 302 and 303 from Bayer Corp., and titanium and zirconium cross-linkers from E.I. du Pont de Nemours and Company (Wilmington, Del.), such as TYZOR TE and LA (Ti-derived water-stable) and TYZOR ZEC (Zr-derived).

Release coating 17 may further include additives, such as release modifiers, rheology agents, surfactants, leveling agents, and defoamers. Examples of such additives may include release modifiers, such as MICHEM 43040 (polypropylene wax emulsion) from Michelman, Inc. (Cincinnati, Ohio), and Fluids 190 and 193 from Dow Corning Corporation (Midland, Mich.); low foam surfactants, such as TRITON CF-10 from The Dow Chemical Company (Midland, Mich.) and ZONYL FSO from E.I. du Pont de Nemours and Company (Wilmington, Del.); rehology modifiers, such as CELLOSIZE ER15 from The Dow Chemical Company; defoamers, such as BYK 19 and 24 from Byk-Chemie GmbH (Wesel, Germany); dispersing agents for inorganic fillers, such as SOLSPERSE 40000 from The Lubrizol Corporation (Wickliffe, Ohio) and DISPERBYK 191, 192 from Byk-Chemie GmbH (Wesel, Germany).

Other additives that may be included in release coating 17 comprise inorganic fillers, such as talc, calcium carbonate, clay, silica, etc. The presence of such inorganic fillers may give a matte-look to the final heat-transfer sheet, as well as improve the break-edge selectivity of the transferred image. Examples of such inorganic fillers may include NYTAL 7700 talc pigment (The Cary Company, Addison, Ill.), VANTALC PC and 4000 talc powders (R.T. Vanderbilt Company, Inc., Norwalk, Conn.), and ULTRAWHITE 90 clay (Engelhard Corporation, Iselin, N.J.). The particle size for the filler may be in the range of about 0.5 to 30μ, particularly about 1 to 20μ, more particularly about 2 to 10μ.

Coating 17 may have a thickness of about 0.01 to about 50 microns, more particularly about 0.02 to about 30 microns, even more particularly about 0.05 to about 20 microns.

Commercially-available release papers may be used as support portion 13. An example of such a release paper is Neenah Paper's product 9804 PF, which is an acrylic release coated on a polyolefin-extruded paper stock with a base weight of 32.8 lbs/1300 ft$^2$.

Transferable portion 14 of sheet 11 may comprise a tie layer 23 positioned directly over release coating 17 and an ink-receptive coating 25 positioned directly over tie layer 23. Alternatively, tie layer 23 could be omitted from transferable portion 14, with ink-receptive layer 25 positioned directly on top of release coating 17.

Tie layer 23 may serve to help the coating and anchoring of ink-receptive coating 25 to release coating 17. Tie layer 23 should be formulated to be compatible with that of ink-receptive layer 25 so that they form a single phase together when melted and transferred.

Ink-receptive coating 25 may include hot-melt adhesive particles held together by a polymeric binder. Properties of ink-receptive coating 25, such as particle size, the nature and ratio amounts of hot-melt adhesive particles vs. the polymeric binder material, may be tuned to yield an ink-receptive coating with sufficient cohesive strength to allow adequate printing and label manipulation while, at the same time, providing sufficient porosity for an ink to print effectively thereon and to be absorbed.

The hot-melt adhesive particles of ink-receptive coating 25 may comprise either a single polyamide species or a mixture of polyamide species. Preferably, the one or more polyamide species are aliphatic polyamides, which may be crystalline, having a softening point in the temperature range of about 50-250° C., more preferably about 70-180° C., and even more preferably about 100-150° C. For example, the polyamide particles may comprise one or more nylon 6, 6-12, and 12-polyamides and/or one or more aliphatic polyamides derived from the reaction of one or more fatty acids with one or more aliphatic diamines. The polyamide particles preferably have a diameter of about 1 to 80 microns, more preferably about 5 to 30 microns, and even more preferably about 10 to 20 microns, and preferably have a specific surface area in the range of about 1-200 m$^2$/g, more preferably about 2-100 m$^2$/g, and even more preferably about 6-20 m$^2$/g. In addition, the polyamide particles preferably have an elevated storage modulus when measured in a molten state for temperatures in the range of 120-200° C. Thus, the resin preferably has a storage modulus (G') of at least 2×10$^4$ dynes/cm$^2$ when measured for the molten state at a temperature of less than 200° C. (Storage modulus (G') is an indirect physical representation of the molecular weight and, hence, the polymer strength at an elevated temperature.)

Examples of suitable polyamides may include ORGASOL® 3502 polyamide (Arkema Chemicals, Inc., Philadelphia, Pa.), ORGASOL® 3501 polyamide, and GRILTEX® EMS polyamides (EMS-Chemie, Inc., Sumter, S.C.). ORGASOL® 3502 polyamide is a 6/12 polyamide powder having an average particle size of 20±3 microns, a melting point of 142° C., a density of 1.07 g/cm$^3$, an apparent density of 0.375 g/cm$^3$, a tensile strength at break of 44 Mpa, an elongation at break of 370%, a specific surface area of 6 m$^2$/g, and a pH of greater than 4. ORGASOL® 3501 polyamide (Arkema Chemicals, Inc., Philadelphia, Pa.) is a 6/12 polyamide powder having an average particle size of 10±3 microns, a melting point of 142° C., a density of 1.07 g/cm$^3$, an apparent density of 0.265 g/cm$^3$, a specific surface area of 20 m$^2$/g, and a pH of greater than 4. Between ORGASOL® 3501 and ORGASOL® 3502, ORGASOL® 3502 is preferred because ORGASOL® 3502 has more strength when subjected to an elevated temperature. However, it may be desirable to blend a small amount of ORGASOL® 3501 together with ORGASOL® 3502 because ORGASOL® 3501 has a higher specific surface area than ORGASOL® 3502 (20 m$^2$/g vs. 6 m$^2$/g, respectively), which higher specific surface area may lead to an improvement in ink absorption and, therefore, to an improvement in print quality. Preferably, the weight ratios of ORGASOL® 3502 to ORGASOL® 3501 range from about 70:30, respectively, to 100:0, respectively, more preferably about 93:7, respectively.

The hot-melt particles of ink-receptive coating 25 may also comprise one or more polyester species or a mixture of polyamide species and polyester species. Examples of suitable polyester resins may include HMP 5184 V polyester powder resin (Bostik-Findley, Middleton, Mass.) and GRILTEX D 1616E, D 1309E, and D1377E polyester resins (EMS-Griltex). Preferably, the polyester powder adhesive has a particle size of no more than about 80μ more preferably no more than about 38-40μ.

The binder of ink-receptive coating 25 binds together the hot-melt adhesive particles and is preferably compatible in melt-phase with the adhesive particles, as well as with ink 12. The binder may be a thermoplastic polymer that is delivered as a water-based emulsion or solution and may include any one or more of the following polymeric materials: poly (vinyl acetate) polymers, ethylene-vinyl acetate copolymers, ethylene-acrylic acid copolymers, polyacrylates, polyamides, polyesters, polyurethanes, or the like. The T$_g$ of the binder may be in the range of about −20-120° C., more particularly about 0-80° C., and even more particularly about 10-700° C. If, as discussed further below, ink-receptive coating 25 also includes a dye-retention agent in the form of a quaternary polymer, then binder emulsions that are stabilized by cationic or non-ionic mechanisms may be preferred. Examples of such binder materials include poly (vinyl alcohol) stabilized emulsions of ethylene-vinyl acetate polymers, such as AIRFLEX 124, 125 and 144 emulsions (Air Products & Chemicals, Inc., Allentown, Pa.), cationic polyurethanes, such as WITCO-BOND® W-213 polyurethane (Chemtura Corporation, Middlebury, Conn.), and cationic polyamides, such as AMRES 8855, 8870, C12, C20, C25, PR-335CU, and PR-247HV polyamide (Georgia Pacific Resins, Inc., Crosett, Ark.).

The binder may be present in ink-receptive coating 25 in a weight ratio (by solids) of about 5 to 50 parts binder:100 parts hot-melt resin, more particularly about 10 to 20 parts binder: 100 parts hot-melt resin.

Ink-receptive coating 25 may additionally include an organic additive that may be used to improve the flexibility, durability, and/or stretchability of the transferred image. Such a flexibility/durability/stretchability additive may include a polyurethane powder. The polyurethane powder may have a particle size in the range of micrometers to tens of micrometers. Within each particle, the polyurethane polymer chain may be inter- or intra-molecularly covalently cross-linked. By cross-linking the polyurethane, the melting characteristic of ink-receptive coating 25 may be unaffected. In this way, the cross-linked polyurethane powder does not affect the melt flow of ink-receptive layer 25 but provides other benefits. Examples of suitable polyurethane powders may include DAIPLACOAT polyurethane powders (Dainichiseika Color & Chemicals Mfg. Co., Ltd., Japan).

Ink-receptive coating 25 may additionally comprise one or more dye-retention agents. Such one or more dye-retention agents may serve to hold acid dye colorants that are present in water-based inks that are printed onto ink-receptive coating 25, thereby diminishing dye diffusion. In one embodiment, the one or more dye-retention agents may comprise one or more cationic polymers. Such one or more cationic polymers may be water-soluble or may be water-insoluble and formulated as a dispersion or emulsion. Such cationic polymers include, but are not limited to, amide-epichlorohydrin polymers, polyacrylamides with cationic moieties, polyethylimines, polydiallylamines, and the like. Specific examples of water-soluble polymers include poly(diallyldimethylammonium chloride), poly(2-hydroxy-3-methacryloxypropyl trimethylammonium chloride), and poly(butylacrylate-methacryloxyethyl trimethylammonium bromide). Specific examples of water-insoluble polymers include quaternary acrylic copolymers like SYNTRAN Hx31-65 trimethyl aminoethyl methacrylate/methyl methacrylate (Interpolymer Corp., Canton, Mass.) and SYNTRAN Hx31-44 1-methoxy-2-propanol acryalte copolymer (Interpolymer Corp.); cationic modified ethylene-acrylic acid emulsions, such as MICHEM® Emulsion 09625 (Michelman, Inc., Cincinnati, Ohio); cationic polyethylene emulsions, such as MICHEM® 9730 (Michelman, Inc.); and cationic shell styrenelacrylate copolymer composition latexes, such as BASOPLAST® 265D (BASF Corporation, Charlotte, N.C.). The aforementioned one or more dye-retention agents may be present in ink-receptive coating 25 in a total weight ratio (by solids) of about 1 to 20 parts dye-retention agent(s):100 parts hot-melt resin.

Ink-receptive coating 25 may additionally comprise one or more ink-viscosity modifying agents. The one or more ink-viscosity modifying agents may serve to modify the viscosity of ink that is printed onto ink-receptive coating 25 and may include, for example, a polyethylene glycol polymer having an average molecular weight ranging from about 100,000 to 2,000,000 daltons, preferably about 100,000 to 600,000 daltons. Examples of suitable ink-viscosity modifying agents include CELLOSIZE ER15 and CELLOSIZE ER100 hydroxylpropyl cellulose (Dow Chemical Company, Midland, Mich.) and POLYOX N-10, N-80, N-750 and N-205 poly(ethylene oxides) (Dow Chemical Company, Midland, Mich.). The one or more ink-viscosity modifying agents may be present in ink-receptive coating 25 in a total weight ratio (by solids) of about 0.1 to 20 parts ink-viscosity modifying agent(s):100 parts hot-melt resin.

Ink-receptive coating 25 may further comprise one or more dispersants or surfactants (the terms "dispersant" and "surfactant" being used interchangeably in the present specification and claims). The one or more dispersants may serve to disperse and to stabilize the hot-melt resin and the plasticizer in dispersion. Preferably, the dispersant is non-ionic or cationic, particularly in those cases in which the dye-retention agent is cationic. Examples of cationic dispersants include tallow trimethylammonium chloride, alkyl sulfo-betaines, and the like. Examples of non-ionic dispersants include alkyl polyethoxylates, such as TERGITOL 15-S-20, 15-S-30 and 15-S-40 surfactants (Dow Chemical Company, Midland, Mich.); and polyethoxylated alkyl phenols, such as TRITON CF-10, TRITON X-45 and TRITON X-100 alkyl and octylphenol ethoxylates (Dow Chemical Company, Midland, Mich.). Other suitable dispersants include polymeric carboxylates, such as SOLSPERSE 27000 dispersant (The Lubrizol Corporation, Wilmington, Del.).

Ink-receptive coating 25 may also comprise other additives to obtain one or more desired characteristics, such additives including, but not being limited to, defoamers, anti-oxidants, UV stabilizers, cross-linkers, and waxes.

Ink-receptive coating 25 may be formed by depositing onto tie layer 23 (or directly onto release coating 17 if tie layer 23 is omitted) a coating composition that includes the above-described ingredients and may further comprise a quantity of water. The deposited coating composition is then dried, leaving only the solids therein. If desired, a co-solvent may also be present in the coating composition. Such co-solvents may include, but are not limited to, alcohols, glycols (e.g., ethylene glycol, propylene glycol, diethylene glycol) and/or other polar solvents that are miscible in water.

Ink-receptive coating 25 may have a thickness of about 40 to 50 microns and a dry coat weight of about 1 g/m² to 100 g/m², preferably about 30 g/m².

As will be explained further below, ink-receptive coating 25 and activating ink 12 are specifically designed so that, under normal heat-transfer conditions (which typically include heating at a temperature of no less than about 140° F. and no more than about 400° F.), the areas 31 of transferable portion 14 that are printed with ink 12 melt and become adhesive whereas the areas 33 of transferable portion 14 that are not printed with ink 12 do not melt and become adhesive. This effect may be achieved by formulating ink-receptive coating 25 so that its melting temperature is higher than that typically encountered during normal heat-transfer conditions and by formulating ink 12 to include a plasticizer or other agent that, when printed onto ink-receptive coating 25, lowers the melting temperature of ink-receptive coating 25 sufficiently so that the modified melting temperature is no greater than the temperature encountered during heat-transfer.

Accordingly, ink 12 may comprise one or more plasticizers that function to lower the melting temperature of the hot-melt adhesive in ink receptive coating 25. The plasticizers may be, for example, conventional plasticizers, in particular N-substituted or unsubstituted benzene sulfonamides, phthalic acid esters, as well as adipic acid and/or sebacic acid esters, trialkyl phosphates, aliphatic polyesters, as well as other polymeric plasticizers, such as, for example, soft urea resins. (C.f. H. K. Felger, Kunststoff-Handbuch volume 1/1C, Hanser-Verlag 1985 and H. F. Mark et al. Encyclopedia of Polymer Science and Engineering, Supplemental Volume pages 568-647, J. Wiley 1989). Preferred plasticizers and plasticizer combinations are those which are liquid at room temperature or are those which, over a temperature interval of 0° C. to 60° C., have low viscosity (1-100 cp) and are miscible in a wide range of solvents.

Specific examples of suitable sulfonamide plasticizers include, but are not limited to, the following: N-butylbenzene sulfonamide (BBSA); p-toluene sulfonamide (PTSA); a mixture of o-toluenesulfonamide and p-toluenesulfonamide (O/PTSA); N-(2-hydroxypropyl)benzene sulfonamide (HPBSA); a mixture of N-ethyl o- and p-toluene sulfonamide (N-E-O/PTSA); N-ethyl-p-toluene sulfonamide (N-E-PTSA); N-methyl-p-toluene sulfonamide (MTSA); N-butyl-p-toluene sulfonamide (BTSA); 2-Carboxybenzene sulfonamide and its ammonium salt; and 4-Carboxybenzene sulfonamide and its ammonium salt.

Specific examples of suitable ester plasticizers include, but are not limited to, the following: dioctyl phthalate, diisodecyl phthalate, diethylhexyl phthalate, di-$C_7$-$C_{11}$-n-alkyl phthalate, tricresyl phosphate, dibenzyltoluene (LIPINOL®T, product of Hüls A G), 2,2,4-trimethyl-1,3-pentanediol dibenzoate (BENZOFLEX® 354, product of Velsicol Chemical Corporation, Rosemont, Ill.) and benzyloctyl phthalate.

The plasticizer concentration in ink 12 may range from about 1-100% by weight, preferably about 20-50% by weight, even more preferably about 25-35% by weight. Ink 12 may also include a colorant, such as a pigment or a dye; alternatively, ink 12 may lack a colorant and may simply be a plasticizer-based, clear ink. Where ink 12 includes a pigment, a wide variety of organic and inorganic pigments, alone or in combination, may be suitable. Such pigments may include those disclosed, for example, in U.S. Pat. Nos. 5,026,427; 5,086,698; 5,141,556; 5,160,370; and 5,169,436, all of which are incorporated herein by reference. In particular, pigments that may be suitable for use in ink 12 include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, and dioxazine pigments. The pigment particles may have a particle size that permits their being jetted through a print head. Preferably, such pigment particles have a mean particle size of less than about 200 nm, more preferably less than about 80 nm.

Where ink 12 includes a dye, a variety of dyes may be used. Examples of solvent-soluble dyes that may be suitable include Neozapon Red 492 (BASF); Orasol Red G (Ciba); Basacid Blue 750 (BASF), Neozapon Black X51 (BASF), Sudan Blue 670 (BASF), Sudan Yellow 146 (BASF), Sudan Red 462 (BASF), mixtures thereof and the like. Examples of water-dispersible dyes may include black dyes, such as Basacid X34, X38, X40 (BASF), Duasyn® NB-SF Direct (Clariant Corp), magenta dyes, such as Basacid Red 316, 400, 495 (BASF), Acid Red 52, Acid Red 82, Acid Red 180, Acid Red 249, yellow dyes, such as Basacid Yellow 93, 99 (BASF), Acid Yellow 17, Acid Yellow 23, Acid Yellow 250, Reactive Yellow 39 and cyan dyes, such as Acid Blue 9, Direct Blue 199, Reactive Blue 2 or Basacid Blue 762 (BASF).

Ink 12 may further comprise a humectant, particularly where ink 12 is intended for use in an ink-jet printer. In such a case, the humectant may help prevent the ink from drying out or crusting in the orifices of the printhead. Humectants are mostly effective in water-based ink formulations. Examples of humectants which may be suitable include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol, with glycerol being preferred.

Ink 12 may further comprise one or more organic solvents, such as cyclohexanone, methylethylketone, methylbutylketone, acetone, toluene, ethyl acetate, mineral spirits, butyl and ethyl lactate, and Aromatic 100 (an aromatic solvent mix from Exxon Mobile). Water-miscible, organic solvents may also be used in ink 12, mixed in various proportions with water when they act as co-solvents. Examples of such water-miscible, organic solvents may include lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidizolidinone; and sulfur-containing compounds, such as dimethyl sulfoxide and tetramethylene sulfone. Other suitable solvents may be disclosed, for example, in U.S. Pat. Nos. 4,626,284, 4,703,113, and 4,963,189, all of which are incorporated herein by reference.

Ink 12 may additionally include other additives to obtain one or more desired characteristics, such additives including, but not being limited to, surfactants, pH buffers, anti-oxidants, and the like.

Ink 12 may be formulated for various different types of print dispensing devices including, but not limited to, digital printing devices, such as ink jet printers, fountains and curtains and writing instruments, such as pens or markers or patterned coating applicators.

Figure 2A:
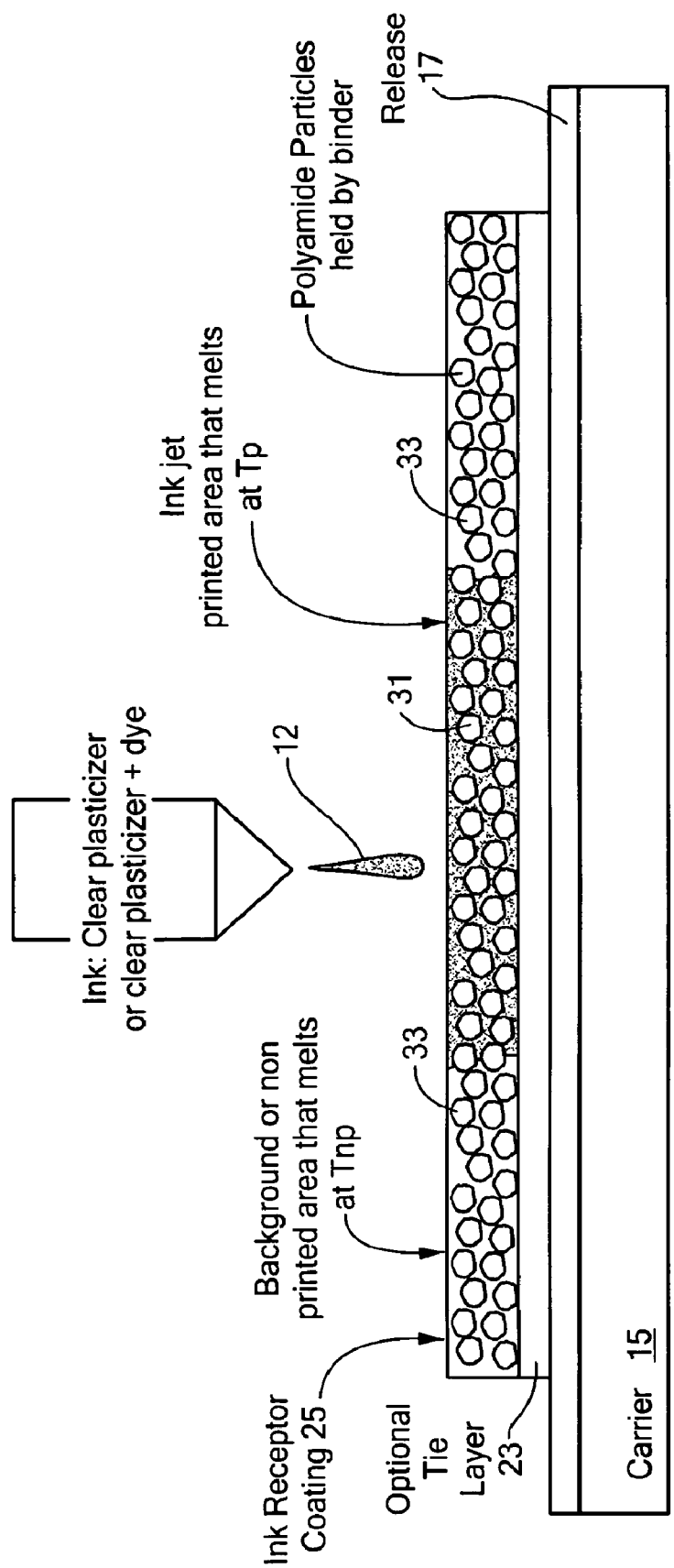
FIGS. 2(a) through 2(c) are schematic end views, showing one way in which the heat-transfer imaging system of FIG. 1 may be used.
Figure 2B:
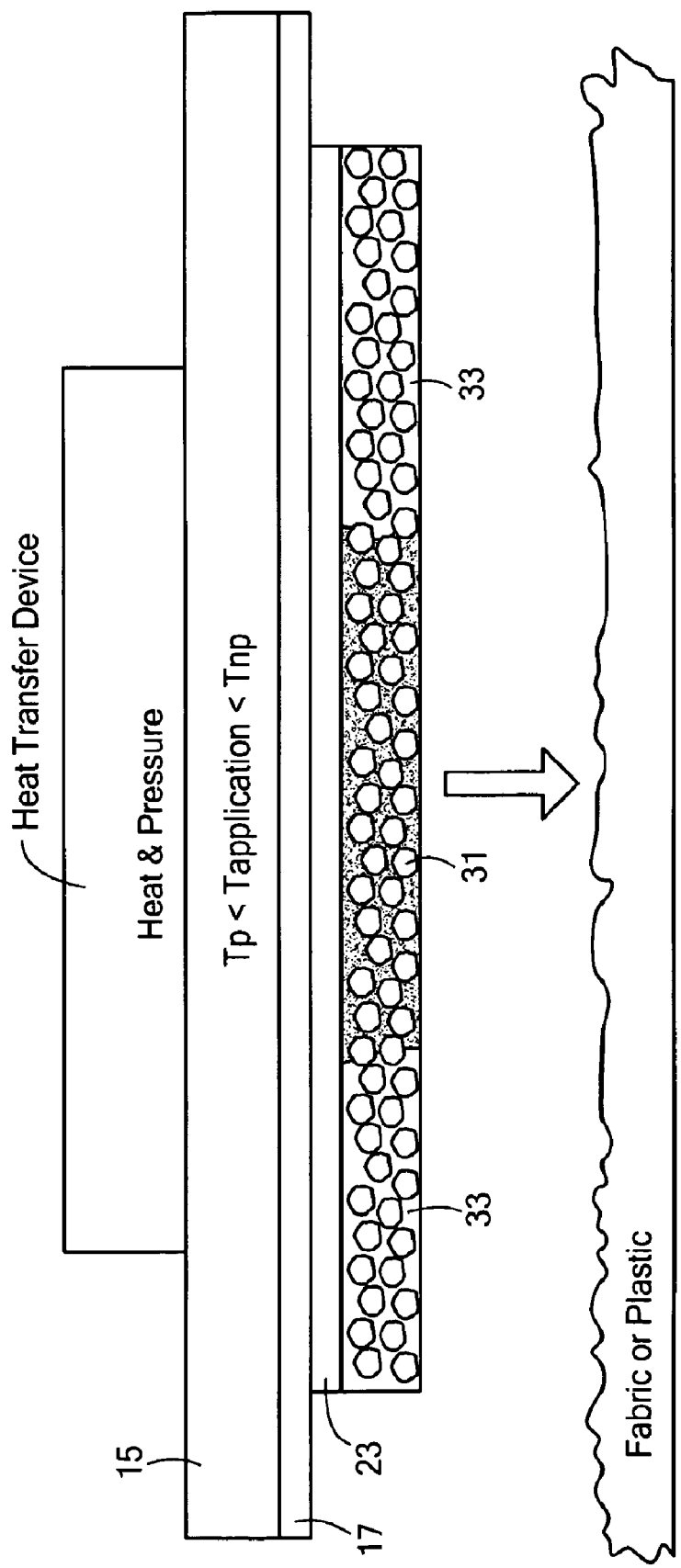
Figure 2C:
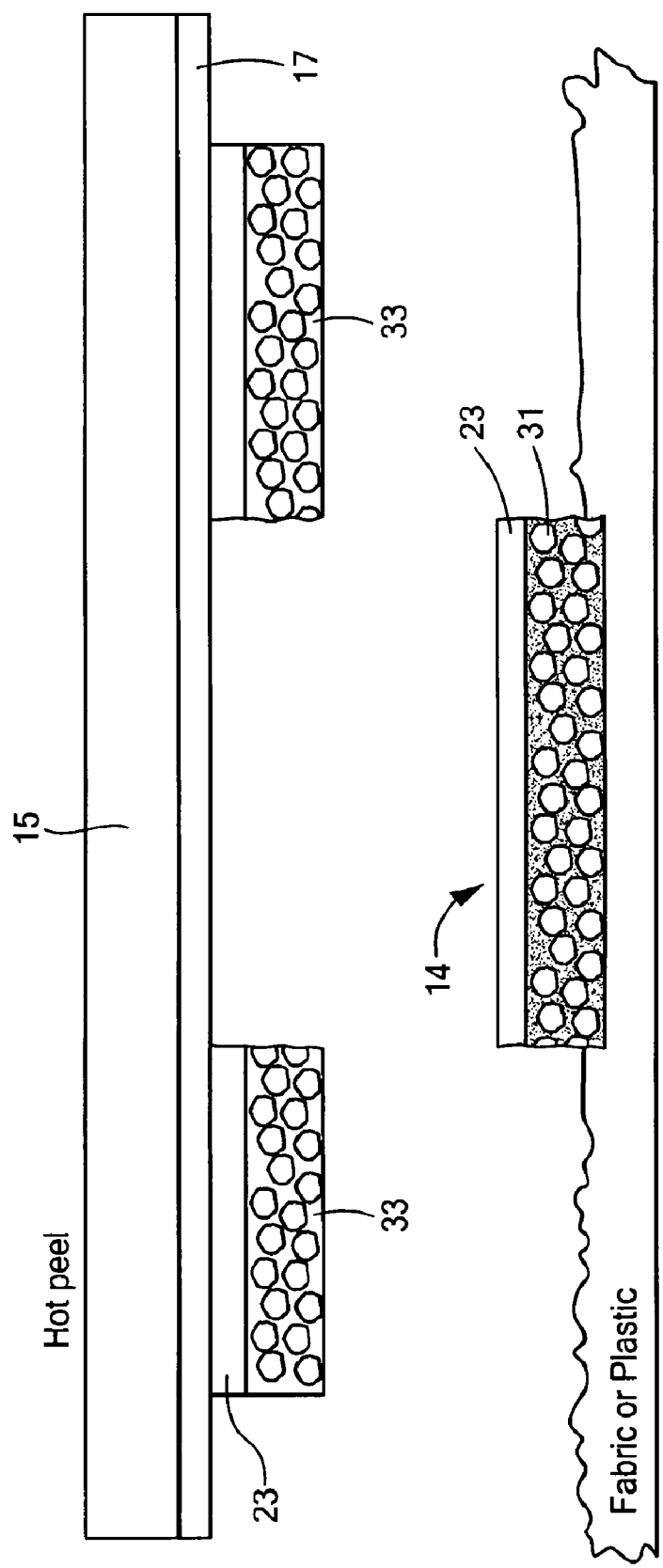

Referring now to FIGS. 2(a) through 2(c), there is schematically shown one manner in which system 10 may be used. In FIG. 2(a), ink 12 is printed onto ink-receptive coating 25 in areas 31, with the remaining areas 33 not being printed onto. In FIG. 2(b), the printed sheet 11 is brought into contact with a desired substrate under heat-transfer conditions, i.e., at a temperature no less than about 140° F. and no greater than about 400° F., using, for example, a conventional heat-transfer device, such as an industrial bonder or a household iron. The application of heat to the printed sheet 11 causes areas 31 of ink-receptive layer 25 (as well as the corresponding areas of tie layer 23) to melt and to adhere to the substrate whereas areas 33 of ink-receptive layer 25 do not melt and adhere to the substrate. In FIG. 2(c), only the activated portions of transferable portion 14 are shown bonded to the substrate after the remainder of heat-transfer sheet 11 has been peeled away from the substrate.

It should be understood that ink 12 may be present over the entirety of the printed matter appearing on ink-receptive layer 25. This will be the case, for example, when the printed matter appearing on ink-receptive layer 25 is created using ink 12 or when the printed matter is printed using one or more conventional inks and, thereafter, ink 12 is printed over the entire footprint of the printed matter. Alternatively, ink 12 may be present only in portions of the printed matter appearing on ink-receptive layer 25 or only around the perimeter of the printed matter appearing on ink-receptive layer 25. This may be achieved, for example, by printing the printed matter with one or more conventional inks and, thereafter, printing ink 12 only in specific areas where one wishes to activate ink-receptive layer 25.

Examples of substrates that may be labeled using system 10 include cotton fabrics, polyester fabrics, leather, and fabric materials used in industrial and consumer durable products.

As can be appreciated, system 10 allows a user to heat-transfer onto fabric materials only the areas that are printed by ink while the background is provided by the fabric material itself. The images could be printed and transferred using digitally-delimited background areas if an additional clear plasticizer based ink is used. This allows the printing and heat transferring of small text on coarse fiber fabrics while preserving sharpness and readability.

This invention may use polymers and plasticizers that are environmental friendly and could be easily disposed by various methods and without any special precautions.

Examples of potential applications of the invention include the following permanent care labels that are non-PVC-based and digitally printed for highly variable small consumer batches; heat-transfer applications for T-shirts and cloth (particularly small shops that could adapt an existing piezo ink-jet printer (e.g. Epson, Mimaki) with new ink delivery system and use it as a cost effective alternative to direct to fabrics specialized printers while providing labels of superior quality) and; heat-transfer labels for industrial and automotive applications. Applications of the invention may also include consumer applications of heat-transfer products. For example, individual consumers may draw on the heat-transfer sheet using a marking pen with the plasticizer ink and then heat-transfer the graphic work via common house irons. Other consumer-specific analog writing media may include pens, air-brushes, fountain-pens, brushes, and the like.

Figure 3:
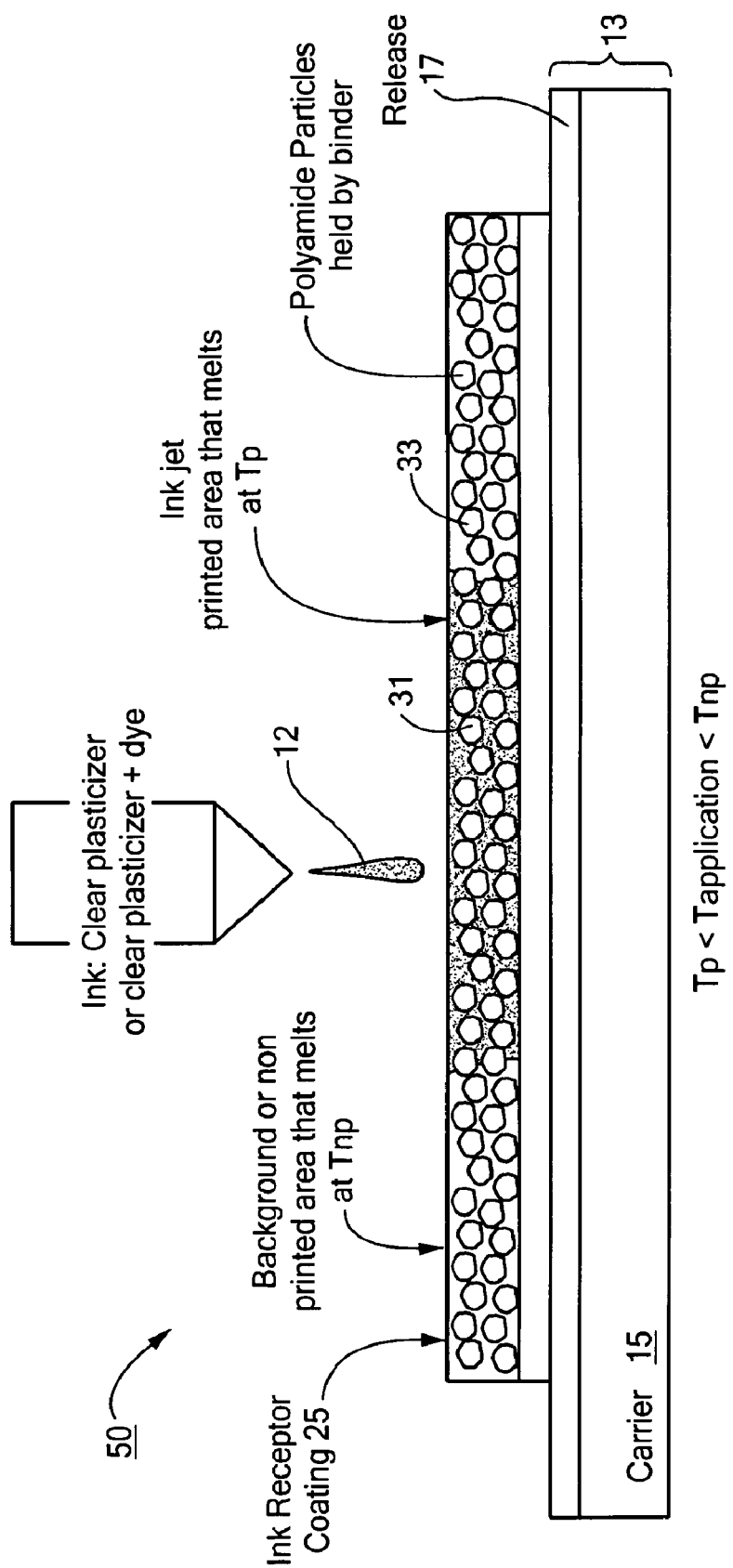
FIG. 3 is a schematic end view of a second embodiment of a heat-transfer imaging system designed according to the teachings of the present invention.

Referring now to FIG. 3, there is schematically shown an end view of a second embodiment of a selective heat-transfer imaging system designed in accordance with the teachings of the present invention, the selective heat-transfer imaging system being represented generally by reference numeral 50.

System 50 is similar in most respects to system 10, the principal difference between the two systems being that system 50 lacks tie layer 23.

Figure 4:
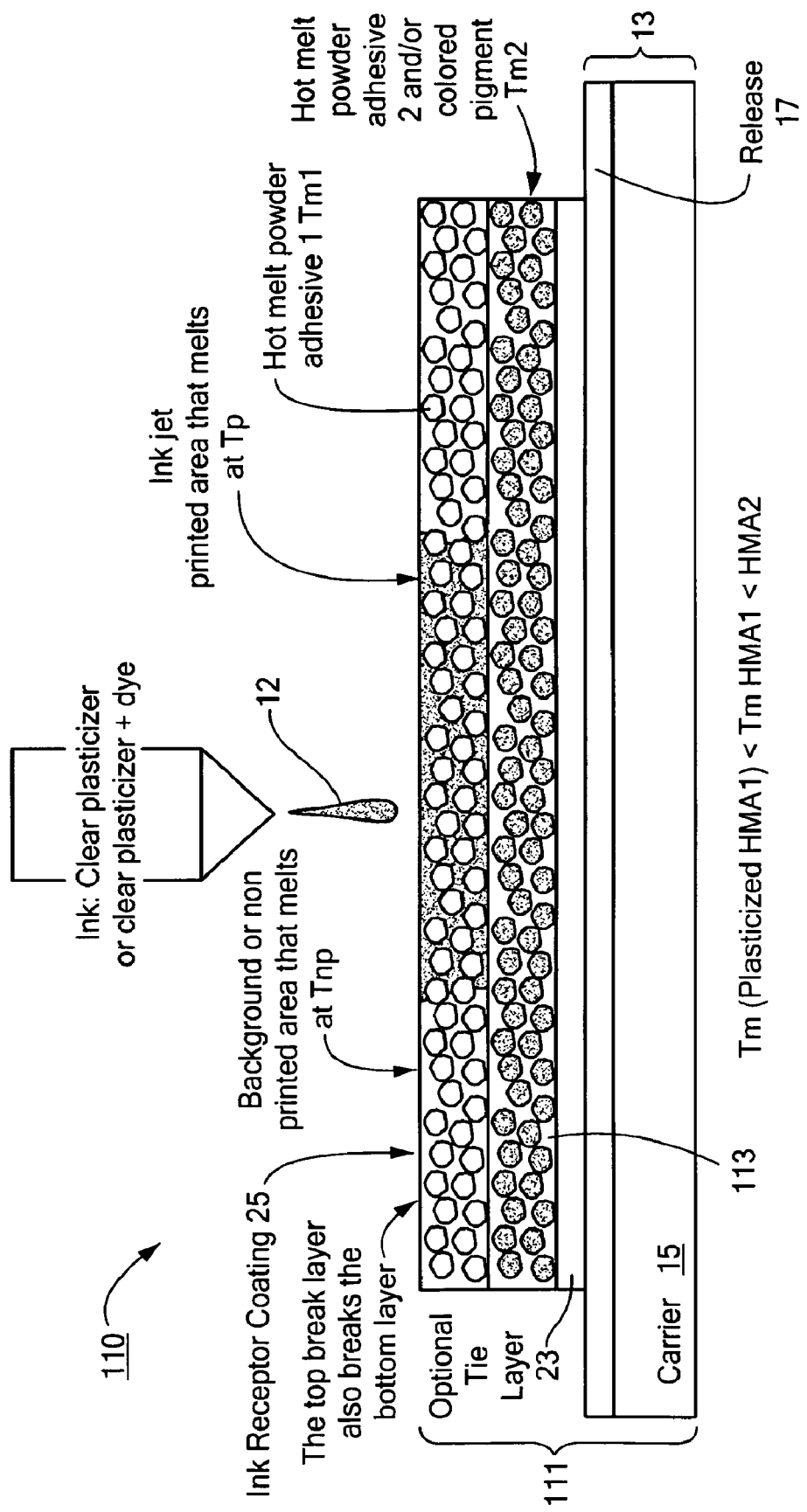
FIG. 4 is a schematic end view of a third embodiment of a heat-transfer imaging system designed according to the teachings of the present invention.

Referring now to FIG. 4, there is schematically shown an end view of a third embodiment of a selective heat-transfer imaging system designed in accordance with the teachings of the present invention, the selective heat-transfer imaging system being represented generally by reference numeral 110.

System 110 is similar in most respects to system 10, the principal difference between the two systems being that system 110 includes a heat-transfer sheet 111 that additionally includes a hot-melt adhesive layer 113 interposed between ink-receptive layer 25 and tie layer 23 (or between ink-receptive layer 25 and coating 17 if tie layer 23 is omitted). Adhesive layer 113, which serves primarily to fix the transferred area more durably to a substrate, is preferably formulated so that its melting temperature is greater than the temperature experienced during heat-transfer of the image. Therefore, during heat-transfer of the image, the areas of adhesive layer 113 that are aligned with the activated areas of ink-receptive layer 25 do not melt but do break away from contiguous areas of adhesive layer 113 that are aligned with the non-activated areas of ink-receptive layer 25. Thereafter, adhesive layer 113 may be melted by a second heating step, at a higher temperature than was used for image transfer, which causes adhesive layer 113 to melt. Such melting of adhesive layer 113 preferably causes adhesive layer 113 to melt through and/or around ink-receptive layer 25 and bond to the substrate.

Adhesive layer 113 may optionally include a colorant, such as a pigment, which may be dispersed between the hot-melt resin particles therein and/or may be present within such particles, themselves. Consequently, one could choose not to print onto ink-receptive layer 25 using a colored ink, but instead, could use a clear ink to cut ink-receptive layer 25 into a transfer having a desired shape and could incorporate color into the transfer using colorant in adhesive layer 113. Alternatively, one could use both clear inks and colored inks on ink-receptive layer 25 and could incorporate additional color into the transfer using adhesive layer 113.

The following examples are illustrative only and are not intended, in any way, to limit the present invention.

Ink Receptive Coatings

EXAMPLE IRC-1

A 9.5 g solution of 10% (w/w) of TERGITOL 15-S-40 secondary alcohol ethoxylate surfactant (The Dow Chemical Company) in water was mixed under moderate stirring in 25 g of deionized water. 15 g of (20p) ORAGSOL® 3502 nylon polyamide powder (Arkema) were then added gradually into the water/TERGITOL solution that was stirred at high speed (1000-5000 rpm) via a high shear stir blade. Upon ORGASOL® 3502 addition, the stirrer speed was decreased to a few hundred rpm; then, a binder emulsion of AIRFLEX 144 3.3 g (55% w/w) and 6 g polyethylene oxide solution N10 (Dow Chemicals—10% w/w in water) were mixed in. The coating solution was kept covered under slow stirring (100 rpm) until ready for coating.

EXAMPLE IRC-2

The procedure was identical with that described for IRC-1 but the Nylon powder used was 15 g ORGASOL® 3501 with a particle size of 10μ.

EXAMPLE IRC-3

The procedure was identical with that described for IRC-1 but the Nylon powder used was a mixture made of 14 g ORGASOL® 3502 and 1 g ORGASOL® 3501.

EXAMPLE IRC-4

The procedure was identical with that described for IRC-1 but the Nylon was replaced with 15 g of Bostik Findley 5184V polyester having a particle size of 30μ.

EXAMPLE IRC-5

A solution of 0.45 g SOLSPERSE 27000 in a mixture of water (34.5 g) and IPA (6.0 g) was kept under intense stirring (1000-1500 rpm) via shear blade stirrer while an amount of 6.50 g of MICHEM dispersion 9625 (25%) (6.50 g) was poured in. This solution was then used to slowly disperse a solid mix made of 13 g of Nylon polyamide powder (10μ) ORGASOL® 3501 (Arkema) and 2 g of EMS-Griltex 2A polyamide powder (35μ). After the polyamide powder addition, the stirrer speed was decreased to a few hundred rpm and a binder emulsion of AIRFLEX 144 2.0 g (55% w/w) was added. This coating solution was kept covered under slow stirring (100 rpm) until ready for coating.

EXAMPLE IRC-6

A solution of 0.45 g SOLSPERSE 27000 in a mixture of water (34.5 g) and IPA (6.0 g) was kept under intense stirring (1000-1500 rpm) via shear blade stirrer while an amount of 6.50 g of MICHEM dispersion 9625 (25%) was poured in. This solution was then used to slowly disperse a solid mix made of 15 g of Nylon polyamide powder (100 ORGASOL® 3501 (Arkema). After the polyamide powder addition, the stirrer speed was decreased to a few hundred rpm and a binder emulsion of AIRFLEX 144 2.0 g (55% w/w) was added. This coating solution was kept covered under slow stirring (100 rpm) until ready for coating.

EXAMPLE IRC-7

The procedure was identical with that described for IRC-6 but all the Nylon powder used was ORGASOL® 2001 having 10μ particle size and a melting temperature of 175° C.

EXAMPLE IRC-8

A solution was prepared by mixing 0.5 g of SOLSPERSE 27000 (Lubrizol), 6.5 g of MICHEM wax dispersion ME9625 (25% w/w) (Michelman) and 23 g of deionized water. To this solution was added under high shear stirring (1000-5000 rpm) 0.027 g of defoamer BYK024 (BYK-Chemie USA Inc), then in small portions 14.0 g of polyamide powder ORGASOL® 3502 (Arkema) followed by another 1.0 g of polyamide powder ORGASOL® 3501 (Arkema). After the polyamide addition was complete, the stirring was decreased to a few hundred rpm and 3.3 g of binder emulsion AIRFLEX144 (55% w/w) was mixed in followed by 2.4 g of CELLOSIZE ER-15 solution (2.0% w/w) (The Dow Chemical Company) and 0.2 g of TRITON CF-10 (The Dow Chemical Company). The coating solution was kept covered under slow stirring (100 rpm) until ready for coating.

EXAMPLE IRC-9

The procedure was similar to that of Example IRC-8; however, the amount of deionized water was reduced to 21.5 g, the resin particles used were 10.27 g of ORGASOL® 3502, 0.73 g of ORGASOL® 3501, and 4 g of DAIPLACOAT 530 Clear (Dainichiseika Color & Chemicals Mfg. Co., Ltd., Japan), and the amount of CELLOSIZE ER15 (2% solution) was increased to 3.6 g.

EXAMPLE IRC-10

An ink-receptive coating was prepared by mixing 5 g of TE3667 PTFE (DuPont), 30 g of water, 0.2 g of TRITON CF-10 (The Dow Chemical Company), 0.5 g of Disper-BYK192 (BYK-Chemie USA Inc), 0.027 g of BYK024 (BYK-Chemie USA Inc), 10 g of ORGASOL® 3502 (Arkema), 4 g of ORGASOL® 3501 (Arkema), 2 g of AIRFLEX144 (Air Products) and 10 g of 2.5% CELLOSIZE ER-15 (The Dow Chemical Company). The mixture was sheared at 1000 rpm for 30 minutes.

EXAMPLE IRC-11

An ink-receptive coating was prepared by mixing 6.5 g of ME9625 (Michelman), 20 g of water, 0.5 g of SOLSPERSE 40000 (Lubrizol), 0.2 g of TRITON CF-10 (The Dow Chemical Company), 0.027 g of BYK024 (BYK-Chemie USA Inc), 14 g of ORGASOL® 3502 (Arkema), 1 g of ORGASOL® 3501 (Arkema), 3.3 g of AIRFLEX144 (Air Products) and 2.35 g of 2.5% CELLOSIZE ER-15 (The Dow Chemical Company).

Ink receptive coatings described above were coated directly or via one or more intermediate layers on a carrier consisting of a paper support (Avon white super smooth classic crest paper 30.3 lb/1300 ft² from Neenah Paper Intl.) that had a polyolefin layer extruded on one side, and a release layer that was coated on top of the polyolefin layer (Neenah Paper Intl., Munising, Mich.). The ink-receptive layer and tie layer were coated on the release side of the carrier.

Ink-Jet Inks

EXAMPLE CLEAR INK-1

An ink-jet ink was formulated by dissolving 1.5 g KETJENFLEX 9S plasticizer (Axentive Corp) in 3.5 g of cyclohexanone solvent.

EXAMPLE CLEAR INK-2

An ink-jet ink was formulated by dissolving 1.5 g of PLASTOL 2158 plasticizer (Boehme Filatex) in 3.5 g of cyclohexanone solvent.

EXAMPLE CLEAR INK-3

An ink-jet ink was formulated by dissolving 1.5 g of PLASTOL 2158 plasticizer (Boehme Filatex) in a mix of 3.5 g 50/50 (v/v) butyl acetate, ethyl acetate.

EXAMPLE CLEAR INK-4

An ink-jet ink was made by using 100% PLASTHALL 226S from CP Hall.

EXAMPLE CLEAR INK-5

15 g of Methyl-2-amino benzensulfonate (Aldrich) and 1 g of TRIZMA (Aldrich) base were mixed in solution made of 21 g deionized water, 5 g glycerol (Aldrich), 3 g NMP (n-methyl-2-pyrrolidinone from Aldrich), and 5 g ammonium hydroxide (29%) (Aldrich). The glass container holding this mixture was placed in an ultrasonic bath and heated at 60° C. while sonicated to clearness (about 1 hr) to complete the ester hydrolysis. This solution was further mixed with 0.1 g of SURFYNOL 104PA (Air Products) and ready for further usage.

EXAMPLE CLEAR INK-6

An ink-jet ink was made by dissolving 3 g of N-ethyl-p-toluene sulfonamide (Aldrich) in a solution of 0.5 g glycerol (Aldrich) and 6.5 g of ethyl lactate (Aldrich).

EXAMPLE CLEAR INK-7

A solvent-based plasticizer ink-jet ink was prepared by mixing 35 g of N-butylbenzene sulfonamide (Uniplex 214, Unitex) with 65 g of 1-Methoxy-2-propanol (Aldrich).

EXAMPLE CLEAR INK-8

A water-based plasticizer ink was prepared by dissolving 15 g of methyl 2-(aminosulfonyl)-benzoate (Sigma-Aldrich) in 5 g of glycerol (Sigma-Aldrich), 3 g of 1-methyl-2-pyrrolidinone (Sigma-Aldrich), 1 g of TRIZMA BASE (Sigma-Aldrich) and 11 g of deionized water. 10 grams of ammonium hydroxide 28% content (Sigma-Aldrich) were added to the mixture and sonicated with an ultrasonic processor (Vibra Cell) for 10 minutes. SURFYNOL 104PA surfactant (Air Products) was added in the amount of 0.1 g as a last component.

EXAMPLE CLEAR INK-9

A solvent-based plasticizer ink was prepared by mixing 45 g of N-Butylbenzene sulfonamide (Uniplex 214, Unitex) with 55 g of 1-Methoxy-2-propanol (Sigma-Aldrich).

EXAMPLE COLOR INK-1

An ink-jet ink was formulated by adding 0.1 g of Sudan Red 500 liquid dye from BASF in a solution made by dissolving 1.5 g KETJENFLEX 9S plasticizer (Axentive Corp) in 3.5 g of cyclohexanone solvent.

EXAMPLE COLOR INK-2

An ink-jet ink was formulated by adding 0.1 g of Sudan Red 500 liquid dye from BASF in a solution made by dissolving 1.5 g PLASTOL 2158 plasticizer (Axentive Corp) in 3.5 g of cyclohexanone solvent.

EXAMPLE COLOR INK-3

An ink-jet ink was formulated by adding 0.1 g of Sudan Red 500 liquid dye from BASF in 5 g of PLASTHALL 226S plasticizer from CP Hall.

EXAMPLE COLOR INK-4

10 g of Clear Ink-5 were mixed in vial with a water-based dye consisting of 0.5 g of Basacid Blue 762 (BASF).

Release Coatings

EXAMPLE RELEASE COATING RC-1

Release paper 9804 PF from Neenah Paper, an acrylic release coated on a polyolefin-extruded paper stock with a base weight of 32.8 lb/1300 ft², was used.

EXAMPLE RELEASE COATING RC-2

A an initial dispersion was prepared by mixing 16.3 g of acrylic emulsion HYCAR 26706 (Lubrizol), 17 g of water, 0.3 g of ammonium hydroxide 29% (Aldrich), 1 g of SOLSPERSE 40000 (Lubrizol) and 10.0 g of MICHEM polypropylene wax dispersion ME 43040 (40% w/w) (Michelman). To this solution was added under high shear stirring (1000-5000 rpm) 0.04 g of defoamer BYK024 (BYK-Chemie USA Inc), then in small portions 16 g of NYTAL 7700 talc (Nytal, Vanderbuild Ind). After the talc addition was complete, the stirring was decreased and 0.5 g of XAMA-7 (Ichemco) was mixed in, followed by 9 g of 2.0% (w/w) CELLOSIZE ER-15 (The Dow Chemical Company) and 0.5 g of TRITON CF-10 (The Dow Chemical Company). The coating solution was kept covered under slow stirring (100 rpm) until ready for coating.

EXAMPLE RELEASE COATING RC-3

A release layer was formulated by mixing 3 g of PTFE dispersion TE3667-N (60% w/w) (DuPont) and 20 g of 1.25% CELLOSIZE ER-15 (The Dow Chemical Company).

EXAMPLE RELEASE COATING RC-4

A release layer was formulated by mixing 16.3 g of HYCAR 26706 (Lubrizol), 14.8 g of water, 0.8 g of ammonium hydroxide (Sigma-Aldrich), 1 g of SOLSPERSE 40000 (Lubrizol), 10 g of ME 43040 (Michelman), 0.72 g of TRITON CF-10 (The Dow Chemical Company) and 0.04 g of BYK024 (BYK-Chemie USA Inc). The mixture was stirred at 600 rpm, and an amount of 16 g of Nytal 7700 talc (Nytal) was added under stirring. 0.5 g of XAMA-7 (Ichemco) and 9 g of 2.5% CELLOSIZE ER-15 (The Dow Chemical Company) were added as last components. The mixture was high-sheared and coated within a few hours.

Coating Techniques

Lab formulated Release Coatings RC-2 and RC-4 were coated via Meyer rod using a bench top manual coater on paper carrier 9773P0 from Neenah Paper, a 24lb. Avon white super smooth classic crest paper extruded on one side with a polyethylene coating (6 lb/1300 ft$^2$) with a total basis weight of 30.3 lb/1300 ft$^2$. The release coating was applied on the polyolefin side. Drying and curing were performed in a lab convection oven set at 95° C. for 5 min. The coat weight of the dried film was tuned to be in the range 20-25 g/m$^2$. Release RC-3 was coated on the clay side of a Loparex paper carrier (78# BL C1S 4000D/000) dried at 95° C. and flattened at 270° F. using a heat press.

Ink-receptive coatings were lab-coated using knife applicator or a Meyer rod using a bench top manual coater on paper liners previously coated with either Release Coating RC-1, RC-2 or RC-4. Ink-receptive coatings were dried in a lab convection oven heated at 70-75° C. for 5 min. The dry coat weights of the ink-receptive layers were tuned in the range 30 to 40 g/m$^2$.

Post-processing of dried ink-receptive coatings: Paper substrates coated with the release coating described above and then with IRC-5 were heat pressed (laminated) at 60 psi and 270° F. for 30 sec. This temperature caused the polyamide powder Griltex 2A to melt and act as a mechanically stronger binder for the higher melting temperature powder ORGASOL® 3501.

Ink-Jet Printing and Heat Application onto White Fabrics

Before printing, all inks were filtered through a 0.2 micron Nylon cartridge filter. The rheology of all inks described was Newtonian with minimal shear-thinning. The inks tested were formulated to have a viscosity in the range of 1-15 cp and a surface tension in the range of 20-35 dynes/cm. With the exception of the examples that included the plasticizer PLASTHALL 226S neat, the percentage of solid material in the inks experimented with was in the range of about 20-35%. The following three printers were used in these experiments:

(1) a Dimatix DMP-2831 that was equipped with 10 μL piezo driven replaceable cartridges (DMC-11610): The cartridges had a volume of about 1.5 mL and used 16 nozzles spaced at 254μ in a single row. DMP-2831 was used mostly to print relatively small single color art designs using solvent-based inks. Text and simple graphics were ink-jetted at 15 and 25-micron inter-drop distances. An ink-jet wave with a period ranging from 10 to 40 microseconds and amplitude of 24V was applied to the piezo valves.

(2) a Mimaki-604S flatbed printer using four piezo-electric drop-on demand printheads each having 2×180 nozzles that were used in the split mode (two different color cartridges per printhead) and equipped with six color ink cartridges (SS2 ink in K-M-Y-C-Lc-Lm configuration): Two spot ink cartridges were filled with the experimental solvent-based plasticizer inks of this invention and shared one separate printhead. In all experiments that used this printer, the plasticizer inks replaced the original white spot ink from Mimaki. Depending on the sharpness desired for the selective heat transfer, the plasticizer inks was printed over the color image in two, three and four passes which applied an amount of dry plasticizer ranging from 10 to 25 g/m$^2$.

(3) an Epson C88 that had all cartridges replaced by refillable cartridges equipped with re-settable chips from MIS Associates (http://www.inksupply.com/) and was used to print the water-based plasticizer inks, such as Clear Ink-5. The ink setting used for the Epson printer was: premium glossy photo paper and best photo.

The printed matter that was used in the experimental testing of the invention included text and graphics. Some printed matter, such as text labels, was printed using inks that combined both the color dye and the plasticizer whereas photographic designs were printed using two separate inks for plasticizer and color. After printing, the graphic images were applied on fabrics from the heat-transfer sheets of the present invention using an air driven CSB-7 heat press from Insta Graphics Systems set at a temperature of 275° F. and at a pressure of 60 psi for a dwell time of 30 sec. After the liner was removed, along with non-printed areas of the transfer sheet, the graphic image on the fabric was optionally fixed by heating with the same type of heat press set at a temperature of 375° F. and at a pressure of 60 psi for a dwell time of 30 sec. A heavy white cotton T-shirt was used as a substrate in all of the experimental examples herein. In all cases, the carrier was cold-peeled, i.e., the transfer sheet/T-shirt was allowed to cool at room temperature for five minutes and then the carrier was hand-peeled away at about a 90 degree angle.

EXAMPLE INK-JET PRINT 1

A transfer sheet coated with the release layer RC-1 and the ink-receptive layer IRC-1 was inkjet printed via a Dimatix DMP-2831 printer using two bitmap designs. The color image was printed using Color-Ink-1. The image was subsequently overprinted using plasticizer based Clear Ink-1. The heat transfer application was carried out as indicated above and gave good graphic edge break performance.

EXAMPLE INK-JET PRINT 2

A transfer sheet coated with the release layer RC-1 and the ink-receptive layer IRC-1 was inkjet printed via a Dimatix DMP-2831 printer using a single bitmap design representing Avery Dennison's corporate logo using Color-Ink-1. The heat-transfer application was carried out as indicated above and gave good graphic edge break performance.

EXAMPLE INK-JET PRINT 3

A transfer sheet coated with the release layer RC-1 and the ink-receptive layer IRC-1 was inkjet printed via a Dimatix DMP-2831 printer using a single bitmap design representing Avery Dennison's corporate logo using Color-Ink-2. The heat-transfer application was carried out as indicated above and gave good graphic edge break performance.

EXAMPLE INK-JET PRINT 4

A transfer sheet coated with the release layer RC-1 and the ink-receptive layer IRC-6 was inkjet printed via a Dimatix DMP-2831 printer using two bitmap designs. The color image was printed using black Durabright ink extracted from the cartridge of an Epson C88 printer. The image was subsequently overprinted using water-based plasticizer Clear Ink- 5. The heat-transfer application was carried out as indicated above and gave good graphic edge break performance.

EXAMPLE INK-JET PRINT 5

A transfer sheet coated with the release layer RC-1 and the ink-receptive layer IRC-6 was inkjet printed via a Dimatix DMP-2831 printer using two bitmap designs. The color image was printed using black Durabright ink extracted from the cartridge of an Epson C88 printer. The image was subsequently overprinted using Clear Ink-6. The heat-transfer application was carried out as indicated above and gave good graphic edge break performance.

EXAMPLE INK-JET PRINT 6

A transfer sheet coated with the release layer RC-1 and the ink-receptive layer IRC-6 was inkjet printed via an Epson C88 (Durabright pigment inks) printer using a color bitmap image. The transfer sheet was then over-printed using with a second Epson C88 printer having all cartridges replaced by refillable cartridges from MIS Associates and containing water-based Clear Ink-5. The printed transfer sheet was heat-applied onto a cotton T-shirt via a digital heat press (60 psi, 30 sec). The temperature application range where Clear Ink-5 was found to be effective in clean breakage of the printed image was from 270° F. to 285° F.

EXAMPLE INK-JET PRINT 7

A transfer sheet coated with the release layer RC-1 and the ink-receptive layer IRC-7 was inkjet printed via an Epson C88 (Durabright pigment inks) printer using a color bitmap image. The transfer sheet was then over-printed with a second Epson C88 printer having all cartridges replaced by refillable cartridges from MIS Associates and containing water-based Clear Ink-5. The printed transfer sheet was heat-applied onto a cotton T-shirt via a digital heat press (60 psi, 30 sec). The temperature application range where Clear Ink-5 was found to be effective in cutting the printed image of IRC-6 was 330° F. to 345° F.

EXAMPLE INK-JET PRINT 8

Figure 5:
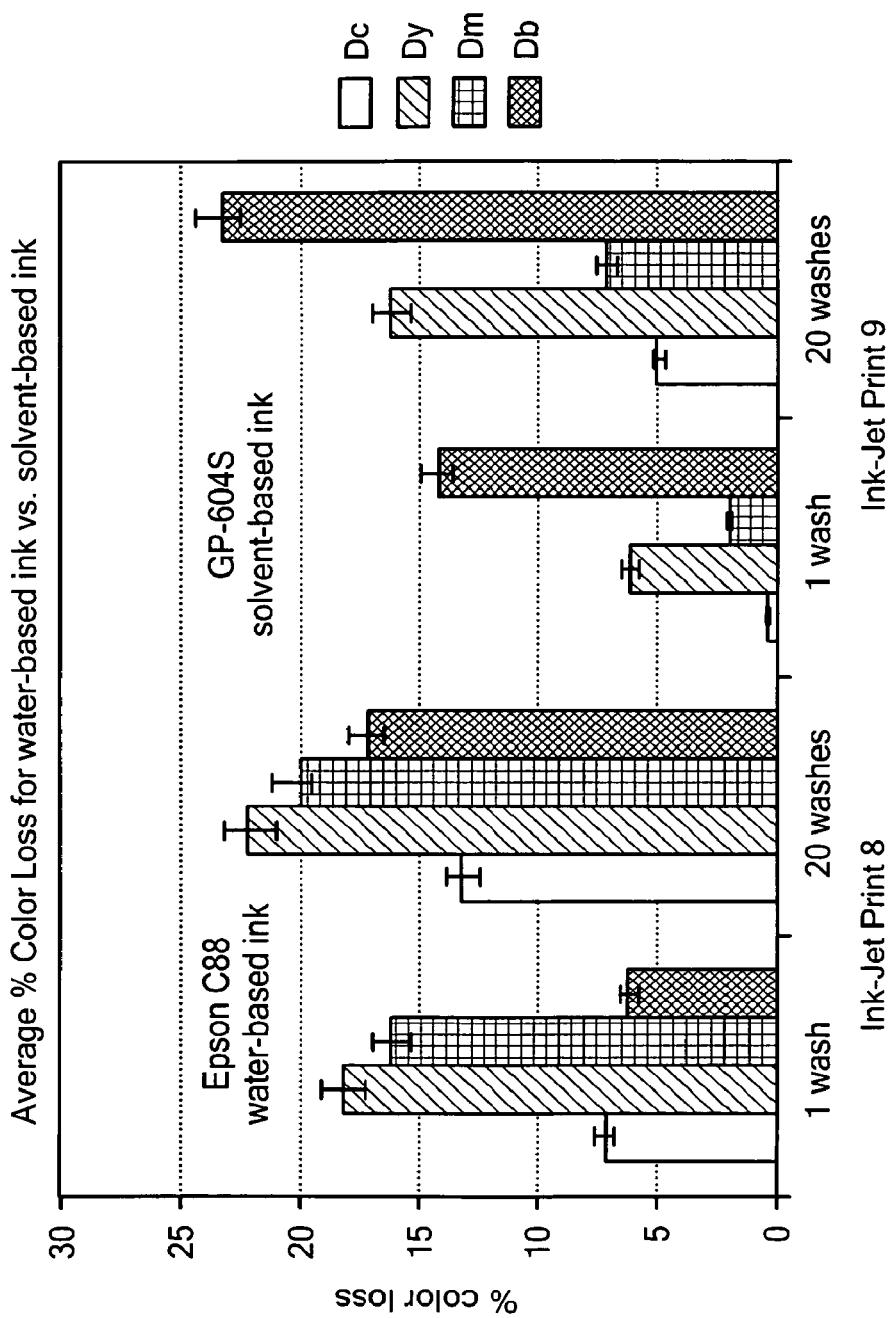
FIG. 5 is a graph showing the average color loss recorded in Example Ink-Jet Print 9 and Example Ink-Jet Print 10.

A transfer sheet coated with the release layer RC-2 and the ink-receptive layer IRC-8 was inkjet printed via an Epson C88 (Durabright pigment inks) printer using a color bitmap image. The transfer sheet was then over-printed with a second Epson C88 printer having all cartridges replaced by refillable cartridges from MIS Associates and containing water-based Clear Ink-5. The printed transfer sheet was heat-applied onto a cotton T-shirt via a digital heat press (60 psi, 30 sec). The heat-transfer application was carried out as indicated above and gave good graphic edge break performance. The T-shirts having the transferred images were washed twenty times using a common household top-loading washing machine. The drying of the T-shirt samples was performed at every five washes using an electrical drier. The loss of color density for each fundamental color (C, M, Y, K) was recorded as a function of wash cycle (see FIG. 5).

EXAMPLE INK-JET PRINT 9

A transfer sheet coated with the release layer RC-2 and the ink-receptive layer IRC-8 was inkjet printed via a Mimaki printer (SS2 pigment inks) printer using a color image. The transfer sheet was then over-printed with using the spot ink facility of the Mimaki printer with plasticizer-based Clear Ink-7. The heat-transfer application was carried out as indicated above and gave good graphic edge break performance. The T-shirts having the transferred images were washed twenty times using a common household top-loading washing machine. The drying of the T-shirt samples was performed at every five washes using an electrical drier. The loss of color density for each fundamental color (C, M, Y, K) was recorded as a function of wash cycle (see FIG. 5).

EXAMPLE INK-JET PRINT 10

A transfer sheet comprising release coating RC-4 and ink-receptive coating IRC-11 was used to receive an image printed with two Epson C88 printers. One of the two Epson C88 printers was used to print a colored image on the ink-receptive coating IRC-11. Cartridges of the other Epson C88 printer were filled with water-based Clear Ink-8, and the image was reprinted over the colored image using the clear ink. The printed image was then transferred selectively to a white cotton garment using a digital heat press from Insta Graphic Systems operated at 275° F. and at 80 psi for 30 seconds.

EXAMPLE INK-JET PRINT 11

A transfer sheet comprising release coating RC-4 and ink-receptive coating IRC-11 was used to receive an image printed with a GP-605S Mimaki printer in which white Mimaki ink cartridges were replaced with cartridges filled with Clear Ink-7 (A comparison of GP-605S Mimaki white ink and Clear Ink-7 s provided in the table below.) A colored image was printed on IRC-11 and then overprinted with solvent-based Clear Ink-7. The printed image was transferred selectively to a white cotton garment using a digital heat press from Insta Graphic Systems operated at 275° F., 80 psi for 30 seconds.

TABLE

| Physical properties of Clear Ink-9 vs. GP-605S Mimaki White Ink | | |
|---|---|---|
| Physical property | GP-605S Mimaki White Ink | Clear Ink-7 |
| Solid, % | 7.0 | 35.0 |
| Surface Tension (dyne/cm) | 29.6 | 29.5 |
| Viscosity (Poise) | 0.04 | 0.04 |

Pen-Marker Writing Experiments

Empty AVERY®-brand pen markers were filled with the plasticizer-based inks of the present invention as described in the following experiments:

EXAMPLE PEN MARKER 1

A transfer sheet that was coated with the release layer RC-1 and the ink-receptive layer IRC-5 and that was further laminated at 270° F. and 60 psi to increase its mechanical durability was used to hand draw images using an AVERY® pen marker filled with Color Ink-4. After heat-transferring using standard conditions (270 F, 60 psi, 30 sec dwell time), only the hand-drawn areas covered with color plasticizer ink were transferred to the fabric.

EXAMPLE PEN MARKER 2

A transfer sheet that was coated with the release layer RC-1 and the ink-receptive layer IRC-5 and that was further laminated at 270° F. and 60 psi to increase its mechanical durability was used to print color images using an Epson C88 printer equipped with OEM Durabright pigmented inks. The areas printed with color images were further hand drawn using an AVERY® pen marker filled with Clear Ink-5. After heat-transferring using standard conditions (270 F, 60 psi, 30 sec dwell time), only the hand-drawn areas covered with color plasticizer ink were transferred to the fabric.

Selective Heat-Transfer onto Dark Fabrics

A white coating WC-1 was Meyer-rod coated on top of release coating RC-2. White coating WC-1 was formulated by mixing 50 g of Mill Base, 0.25 g of TRITON CF-10 (The Dow Chemical Company), 14 g of ORGASOL® 3502 (Arkema) and 10 g of 2.5% CELLOSIZE ER-15 (The Dow Chemical Company). The mixture was sheared at 1000 rpm for 30 minutes. Mill Base was prepared by dispersing 40 g of TI-PURE R104 (DuPont) in 152 g of water, 4 g of Disper-BYK192 (BYK-Chemie USA Inc), 0.1 g of BYK024 (BYK-Chemie USA Inc) and 4 g of AIRFLEX 144 (Air Products).

Thereafter, ink-receptive coating IRC-10 was coated over white coating WC-1 to yield a transfer sheet comprising release RC-2, white coating WC-1 and ink-receptive layer IRC-10, respectively. The foregoing transfer sheet was inkjet printed via a Mimaki G-604S printer (SS2 pigment inks). A colored image was printed on the transfer sheet and then overprinted using the spot ink Mimaki cartridges filled with Clear Ink-7. The image was then transferred selectively from the transfer sheet to release coating RC-3 at 280° F. (60 psi, 30 sec dwell time) and subsequently transferred from release coating RC-3 to a dark cotton garment at 320° F. (60 psi, 30 sec dwell time) using a digital heat press from Insta Graphic Systems.

In addition, a transfer sheet comprising release coating RC-2, white layer WC-1 and ink-receptive layer IRC-10, respectively, was inkjet printed via Epson C88 (Durabright pigment inks). Two Epson C88 printers were used to print the image. One Epson C88 printer was used to print a colored bitmap image. The transfer sheet was then overprinted with a second Epson C88 printer having all cartridges replaced by refillable cartridges from MIS Associates filled with water-based Clear Ink-5. The image was then transferred selectively from the transfer sheet to release coating RC-3 at 280° F. (60 psi, 30 sec dwell time) and subsequently transferred from release coating RC-3 to a dark cotton garment at 320° F. (60 psi, 30 sec dwell time) using a digital heat press from Insta Graphic Systems.

The embodiments of the present invention recited herein are intended to be merely exemplary and those skilled in the art will be able to make numerous variations and modifications to it without departing from the spirit of the present invention. All such variations and modifications are intended to be within the scope of the present invention.

What is claimed is:

1. A heat-transfer imaging system, the heat-transfer imaging system comprising:
   (a) a heat-transfer sheet, the heat-transfer sheet comprising a support portion and an ink-receptive coating, the ink-receptive coating being releasably coupled to the support portion, the ink-receptive coating possessing a melting temperature greater than a heat-transfer temperature, the heat-transfer temperature being no less than about 140° F. and no greater than about 400° F.; and
   (b) an activating ink, the activating ink being printable on the ink-receptive coating and comprising an agent for lowering the melting temperature of the ink-receptive coating in an area contacted with the activating ink to no more than the heat-transfer temperature.

2. The heat-transfer imaging system as claimed in claim 1 wherein the support portion comprises a carrier and a release coating, the release coating being coated over the carrier, the ink-receptive coating being positioned over the release coating.

3. The heat-transfer imaging system as claimed in claim 2 wherein the ink-receptive coating is positioned directly over the release coating.

4. The heat-transfer imaging system as claimed in claim 2 further comprising a tie layer, the tie layer being positioned directly over the release coating, the ink-receptive coating being positioned directly over the tie layer.

5. The heat-transfer imaging system as claimed in claim 2 further comprising a hot-melt adhesive layer, the hot-melt adhesive layer being positioned between the ink-receptive coating and the release coating.

6. The heat-transfer imaging system as claimed in claim 2 further comprising a white coating, the white coating being positioned between the ink-receptive coating and the release coating.

7. The heat-transfer imaging system as claimed in claim 2 wherein the carrier is selected from the group consisting of a polymer film substrate, a paper substrate, and a polymer-coated paper substrate.

8. The heat-transfer imaging system as claimed in claim 7 wherein the carrier is a polymer film substrate, the polymer film substrate being optically clear.

9. The heat-transfer imaging system as claimed in claim 1 wherein the ink-receptive coating includes hot-melt adhesive particles held together by a polymeric binder.

10. The heat-transfer imaging system as claimed in claim 9 wherein the hot-melt adhesive particles comprise one or more species of polyamide particles.

11. The heat-transfer imaging system as claimed in claim 10 wherein the hot-melt adhesive particles comprise a mixture of polyamide particles and polyester particles.

12. The heat-transfer imaging system as claimed in claim 11 wherein the polyester particles have a particle size of no more than about 80μ.

13. The heat-transfer imaging system as claimed in claim 9 wherein the hot-melt adhesive particles have a softening point of about 70-180° C.

14. The heat-transfer imaging system as claimed in claim 9 wherein the hot-melt adhesive particles have a diameter of about 1 to 80 microns.

15. The heat-transfer imaging system as claimed in claim 9 wherein the polymeric binder is a thermoplastic polymer delivered as a water-based emulsion or solution.

16. The heat-transfer imaging system as claimed in claim 15 wherein polymeric binder comprises one or more thermoplastic polymers selected from the group consisting of poly(vinyl acetate) polymers, ethylene-vinyl acetate copolymers, ethylene-acrylic acid copolymers, polyacrylates, polyamides, polyesters, and polyurethanes.

17. The heat-transfer imaging system as claimed in claim 9 wherein the polymeric binder and the hot-melt adhesive particles are present in the ink-receptive coating in a weight ratio by solids of about 5 to 50 parts polymeric binder:100 parts hot-melt adhesive particles.

18. The heat-transfer imaging system as claimed in claim 9 wherein the ink-receptive coating further includes a cross-linked polyurethane powder.

19. The heat-transfer imaging system as claimed in claim 9 wherein the ink-receptive coating further comprises one or more dye-retention agents.

20. The heat-transfer imaging system as claimed in claim 9 wherein the ink-receptive coating further comprises one or more ink-viscosity modifying agents.

21. The heat-transfer imaging system as claimed in claim 9 wherein the ink-receptive coating further comprises one or more dispersants or surfactants.

22. The heat-transfer imaging system as claimed in claim 1 wherein the ink-receptive coating has a thickness of about 40 to 50 microns and a dry coat weight of about 1 g/m$^2$ to 100 g/m$^2$.

23. The heat-transfer imaging system as claimed in claim 1 wherein the agent for lowering the melting temperature of the ink-receptive coating comprises one or more plasticizers.

24. The heat-transfer imaging system as claimed in claim 23 wherein the one or more plasticizers are selected from the group consisting of N-substituted or unsubstituted benzene sulfonamides, phthalic acid esters, adipic acid and/or sebacic acid esters, trialkyl phosphates, aliphatic polyesters, and soft urea resins.

25. The heat-transfer imaging system as claimed in claim 1 wherein the activating ink is clear.

26. The heat-transfer imaging system as claimed in claim 1 wherein the activating ink further comprises a colorant.

27. The heat-transfer imaging system as claimed in claim 26 wherein the colorant is a pigment.

28. The heat-transfer imaging system as claimed in claim 26 wherein the colorant is a dye.

29. The heat-transfer imaging system as claimed in claim 1 wherein the activating ink further comprises a humectant.

30. The heat-transfer imaging system as claimed in claim 1 wherein the activating ink is formulated for use in an ink-jet printer.

31. The heat-transfer imaging system as claimed in claim 1 wherein the activating ink is formulated for use in a writing instrument.

32. The heat-transfer imaging system as claimed in claim 1 further comprising a writing instrument, the activating ink being dispensed from the writing instrument.

33. The heat-transfer imaging system as claimed in claim 1 wherein the heat transfer temperature is about 275° F.

34. A method of transferring an image to a substrate, the method comprising the steps of:
    (a) providing a heat-transfer device;
    (b) providing a heat-transfer sheet, the heat-transfer sheet comprising a support portion and an ink-receptive coating, the ink-receptive coating being releasably coupled to the support portion, the ink-receptive coating possessing a first melting temperature;
    (c) providing an activating ink, the activating ink being printable on the ink-receptive coating of the heat-transfer sheet and comprising an agent for lowering the melting temperature of the ink-receptive coating in an area contacted with the activating ink to a second melting temperature;
    (d) printing an image onto the ink-receptive coating of the heat-transfer sheet using the activating ink, the activating ink being printed onto a portion, but not all, of the ink-receptive coating of the heat-transfer sheet, whereby one or more printed areas of the ink-receptive coating and one or more non-printed areas of the ink-receptive coating are produced; and
    (e) contacting the ink-receptive coating with the substrate using the heat-transfer device operated at an operating temperature of no less than about 140° F. and no more than about 400° F., wherein the second melting temperature of the one or more printed areas of the ink-receptive coating is less than the operating temperature of the heat-transfer device and the first melting temperature of the one or more non-printed areas of the ink-receptive coating is greater than the operating temperature of the heat-transfer device, whereby the one or more printed areas of the ink-receptive coating transfer to the substrate and the one or more non-printed areas of the ink-receptive coating do not transfer to the substrate.

35. The method as claimed in claim 34 wherein the operating temperature of the heat-transfer device is about 275° F.

36. A method of transferring at least a portion of an image to a substrate, the method comprising the steps of:
    (a) providing a heat-transfer device;
    (b) providing a heat-transfer sheet, the heat-transfer sheet comprising a support portion and an ink-receptive coating, the ink-receptive coating being releasably coupled to the support portion, the ink-receptive coating possessing a first melting temperature;
    (c) providing an activating ink, the activating ink being printable on the ink-receptive coating of the heat-transfer sheet and comprising an agent for lowering the melting temperature of the ink-receptive coating to a second melting temperature;
    (d) printing an image onto the ink-receptive coating of the heat-transfer sheet;
    (e) printing the activating ink onto a portion, but not all, of the ink-receptive coating of the heat-transfer sheet, whereby one or more activated areas of the ink-receptive coating and one or more non-activated areas of the ink-receptive coating are produced, the one or more activated areas containing at least a portion of the image; and
    (f) contacting the ink-receptive coating with the substrate using the heat-transfer device operated at an operating temperature of no less than about 140° F. and no more than about 400° F., wherein the second melting temperature of the one or more activated areas of the ink-receptive coating is less than the operating temperature of the heat-transfer device and the first melting temperature of the one or more non-activated areas of the ink-receptive coating is greater than the operating temperature of the heat-transfer device, whereby the one or more activated areas of the ink-receptive coating transfer to the substrate and the one or more non-activated areas of the ink-receptive coating do not transfer to the substrate.

37. The method as claimed in claim 36 wherein the activating ink is clear.

38. The method as claimed in claim 36 wherein the operating temperature of the heat-transfer device is about 275° F.

39. The combination of a heat-transfer device and a heat-transfer imaging system, the heat-transfer device being operated an operating temperature of no less than about 140° F. and no more than about 400° F., the heat-transfer imaging system comprising a heat-transfer sheet and an activating ink, the heat-transfer sheet comprising a support portion and an ink-receptive coating, the ink-receptive coating being releasably coupled to the support portion, the ink-receptive coating possessing a melting temperature greater than the operating temperature of the heat-transfer device, the activating ink being printable on the ink-receptive coating and comprising an agent for lowering the melting temperature of the ink-receptive coating in an area contacted with the activating ink to no more than the operating temperature of the heat-transfer device.

40. The combination as claimed in claim 39 wherein the operating temperature of the heat-transfer device is about 275° F.

* * * * *